(12) United States Patent
Fukamizu et al.

(10) Patent No.: US 7,420,348 B2
(45) Date of Patent: Sep. 2, 2008

(54) DRIVE APPARATUS

(75) Inventors: Shingo Fukamizu, Takatsuki (JP);
Yasunori Yamamoto, Hirakata (JP);
Shuji Tamaoka, Nagaokakyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 326 days.

(21) Appl. No.: 11/358,523

(22) Filed: Feb. 21, 2006

(65) Prior Publication Data

US 2006/0208680 A1    Sep. 21, 2006

(30) Foreign Application Priority Data

Feb. 22, 2005    (JP)    ............... 2005-045693

(51) Int. Cl.
*G05B 11/01* (2006.01)
(52) U.S. Cl. .................. 318/560; 318/561; 318/590; 318/652; 369/30.17; 369/44.28; 369/44.29
(58) Field of Classification Search ................ 318/560, 318/561, 590, 652; 369/30.17, 44.28, 44.29
See application file for complete search history.

(56) References Cited

U.S. PATENT DOCUMENTS

| 5,015,932 | A | | 5/1991 | Wachi | |
|---|---|---|---|---|---|
| 5,101,386 | A | * | 3/1992 | Kojima et al. | 369/44.28 |
| 5,195,067 | A | * | 3/1993 | Yanagi | 369/30.17 |
| 5,309,417 | A | * | 5/1994 | Onodera et al. | 369/30.15 |
| 5,581,527 | A | * | 12/1996 | Onodera et al. | 369/53.28 |
| 6,236,032 | B1 | * | 5/2001 | Kamiyama | 250/201.5 |
| 6,628,580 | B1 | * | 9/2003 | Kishimoto et al. | 369/44.28 |
| 6,819,636 | B1 | * | 11/2004 | Soma et al. | 369/44.11 |
| 6,894,957 | B1 | * | 5/2005 | Shimada | 369/44.32 |
| 6,925,037 | B2 | * | 8/2005 | Kishimoto et al. | 369/44.29 |
| 6,934,227 | B2 | * | 8/2005 | Nakata et al. | 369/44.32 |
| 6,952,387 | B2 | * | 10/2005 | Nishio et al. | 369/53.23 |
| 7,106,666 | B2 | * | 9/2006 | Ishikawa et al. | 369/30.1 |
| 7,304,919 | B2 | * | 12/2007 | Ando | 369/44.29 |
| 2003/0043706 | A1 | * | 3/2003 | Nakata et al. | 369/44.13 |
| 2003/0210615 | A1 | * | 11/2003 | Uchida et al. | 369/13.11 |
| 2004/0004923 | A1 | * | 1/2004 | Hirai et al. | 369/53.28 |
| 2004/0013056 | A1 | * | 1/2004 | Ando | 369/44.29 |

(Continued)

FOREIGN PATENT DOCUMENTS

JP    02-046575    2/1990

(Continued)

*Primary Examiner*—Paul Ip
(74) *Attorney, Agent, or Firm*—RatnerPrestia

(57) ABSTRACT

Optical disc drives designed for reduced power consumption switch the supply voltage in three stages between first, second, and third power supplies. The reduction in power consumption that is possible in the focusing and tracking drive circuits with three stage switching control is limited. This drive apparatus enables further reductions in power consumption. A drive output tracking signal is generated according to the drive conditions of the focusing or tracking drive circuit. The drive output tracking signal is applied to the drive circuit power supply, and the power supply is controlled according to the drive output tracking signal. A power supply change detector detects sudden changes in the drive output tracking signal, and inputs the detection signal to the DSP controlling the entire system. The DSP determines whether to improve the power supply response by comparison with predetermined conditions, and returns the result to the power supply.

29 Claims, 24 Drawing Sheets

U.S. PATENT DOCUMENTS

| | | | |
|---|---|---|---|
| 2005/0094508 A1* | 5/2005 | Seo | 369/44.29 |
| 2005/0117465 A1* | 6/2005 | Kishimoto et al. | 369/30.27 |
| 2005/0195707 A1* | 9/2005 | Park et al. | 369/44.26 |
| 2006/0221470 A1* | 10/2006 | Kurokawa | 359/814 |
| 2006/0238160 A1* | 10/2006 | Fukamizu et al. | 318/652 |
| 2006/0285455 A1* | 12/2006 | Cheng et al. | 369/47.28 |
| 2007/0147206 A1* | 6/2007 | Tada | 369/53.23 |
| 2007/0183277 A1* | 8/2007 | Matsumoto | 369/44.29 |
| 2007/0253305 A1* | 11/2007 | Watanabe et al. | 369/94 |
| 2007/0256088 A1* | 11/2007 | Yamamoto et al. | 720/601 |
| 2007/0263882 A1* | 11/2007 | Nakata | 381/107 |

FOREIGN PATENT DOCUMENTS

| | | |
|---|---|---|
| JP | 03-005922 | 1/1991 |
| JP | 04-026929 | 1/1992 |
| JP | 05-314481 | 11/1993 |
| JP | 2001-155349 | 6/2001 |
| JP | 2003-132555 | 5/2003 |
| JP | 3513062 | 1/2004 |

* cited by examiner

2228

2360

DRIVE APPARATUS

BACKGROUND OF THE INVENTION

1. Field of Technology

The present invention relates generally to a drive apparatus for an optical disc recording and reproducing apparatus, and relates more particularly to technology for reducing the power consumption of the drive circuit for driving an actuator while assuring a high response rate in the drive circuit.

2. Description of Related Art

Optical disc media offer numerous benefits, including long media life as a result of non-contact recording and reading, random accessibility enabling significantly faster access to desired content than is possible with magnetic tape, and a large storage capacity. Disc drives for reading and/or writing Compact Disc (CD) and DVD (digital versatile disc) have thus become standard equipment on most personal computers sold today. In order to meet the demand for ever higher data transfer rates, faster disc motors are being used to rotationally drive the optical discs.

Optical disc drives used in desktop personal computers generally have a 5-V power supply with an output voltage of 5 volts, or a 12-V power supply with an output voltage of 12 volts. Two types of actuators are used in order to track the laser spot with an optical pickup, which is a type of movable head. One of these is a focusing actuator for adjusting the focus by moving the objective lens of the optical pickup in the focusing direction. The other is a tracking actuator for tracking the recording path by moving the objective lens in the tracking direction. The 5-V power supply and 12-V power supply are generally used to drive the focusing drive circuit and tracking drive circuit that respectively drive these actuators. The highest possible power supply voltage is used to drive the disc motor in order to increase disc speed, and a 12-V power supply is generally used in desktop personal computers. With increased integration of the DSP (digital signal processor) chips, a signal process circuit that operates with an approximately 3.3-V supply voltage is also increasingly incorporated in the optical disc drive.

Depending upon the optical disc drive operating conditions, the supply voltage to both the focusing and tracking drive circuits is preferably as high as possible. When the disc motor speed increases, for example, the servo also accelerates more quickly to the point being tracked on the disc. This requires operating both the focusing and tracking actuators at a higher rate of acceleration, and requires a stronger coil current. As a result, a high supply voltage is preferable for both the focusing and tracking drive circuits.

Increasing the access speed during optical disc playback requires moving and stopping the light spot at high speed in the tracking direction, and this requires operating the tracking actuator at a high rate of acceleration. This also makes a high supply voltage preferable for the tracking drive circuit.

A high supply voltage is also preferable for the focusing drive circuit when playing a disc with warp. When playing a disc with eccentricity, the supply voltage of the tracking drive circuit is preferably high. There are thus various circumstances in which a high power supply voltage is necessary.

The need for faster operation as described above is complicated by strong demand for low power consumption. The drivers for driving the actuators use PWM (pulse width modulation) control instead of linear drive control based on BTL drivers using bipolar transistors. This is because PWM drivers can reduce the power loss resulting from the internal voltage drop of the circuit. Noise output by the PWM driver as a result of high frequency current switching is a problem for the optical disc drive, however, and thus requires a separate unit for suppressing such circuit emissions.

More particularly, the playback signal output from the optical pickup can be extremely weak in an optical disc drive that can both read and write. If the PWM driver is used to drive the actuator that moves the objective lens of the optical pickup at this time, electrical noise from the PWM driver will interfere with the playback signal from the optical pickup. This can result in optical disc drive malfunctions and a higher error rate.

To avoid this problem, optical disc drives for both reading and writing quite commonly drive the relatively low frequency, high current consumption disc motor drive circuit with a PWM driver, and drive the relatively low current consumption, high frequency focusing and tracking drive circuits with a linear drive BTL driver.

The product of the current times the difference between the power supply voltage and the voltage actually applied to the actuator in the focusing and tracking drive circuits is lost as heat energy in the BTL driver circuit. When an optical disc is played at low speed, a high power supply voltage is not required for the drive circuit. However, because a high supply voltage (12V) is used for the power supply of the drive circuit, a significant amount of power is wasted and excess heat is generated in the linear drive type BTL drive circuits. In other words, if the power supply voltage supplying the drive current is high even though the current required to drive the focusing and tracking actuators is low, power consumption by the power output transistors increases, and heat and power consumption by the chips containing the linear drive type BTL driver become a problem.

Setting the power supply voltage no higher than is necessary is one way to avoid this problem. However, when something with greater deviation than is expected during normal operation occurs, such as when a disc with warping or eccentricity very near the specification limit is inserted to the optical disc drive, the drive current supplied to the actuator that moves the objective lens of the optical pickup becomes insufficient, and the ability of the optical disc drive to play such discs drops. There is thus a trade-off between disc playability and the ability to reduce heat output by lowering the supply voltage.

Recent hybrid driver chips combine the functions of the disc motor drive circuit and focusing and tracking drive circuits in a single device. When the disc motor is driven at high speed, the motor current to the disc motor increases, and power consumption by the disc motor drive circuit in the hybrid driver chip increases. If the high supply voltage (12V) is used as the power supply for the focusing and tracking drive circuits at this time, the internal power consumption of the hybrid drive chip increases and the chip temperature rises. If the optical disc drive is used in a high temperature environment, the temperature of the hybrid drive chip may even exceed the maximum temperature limit. The problems of power consumption and heat output are thus tending to become even more pronounced in IC devices having an onboard linear drive type BTL driver and optical disc drives that use such IC devices.

To address these problems and needs, Japanese Unexamined Patent Appl. Pub. 2003-132555 teaches technology for switching the power supply voltage of the focusing and tracking drive circuits according to the operating conditions of the optical disc drive. FIG. 1 shows the optical disc drive taught in Japanese Unexamined Patent Appl. Pub. 2003-132555. Note that only those parts needed to describe the operating principle of this optical disc drive are shown in FIG. 1.

Referring to FIG. 1, the optical pickup 130 emits a light beam to the optical disc 100, and the light reflected from the disc is converted to an electric signal that represents the information on the disc and is output to the playback signal processing circuit 140. The playback signal processing circuit 140 adjusts the amplitude of this playback signal, which is then demodulated by the playback signal demodulation circuit 150 to reproduce the information previously recorded on the optical disc 100.

The DSP unit 500 includes a microcomputer 510 and servo circuit 520. Rotation of the disc motor 110 is controlled by the disc motor drive circuit 120 based on signals output from the servo circuit 520 according to speed commands from the microcomputer 510, thereby driving the optical disc 100 at a specified speed.

The playback signal processing circuit 140 generates a focus error signal and a tracking error signal. The focus error signal indicates positioning error in the focal point of the laser beam in the focusing direction, and the tracking error signal indicates positioning error in the focal point of the laser beam in the tracking direction.

Based on the focus error signal output by the playback signal processing circuit 140, the servo circuit 520 controls the position of the focal point of the light spot in the focusing direction by the focusing drive circuit 220 and focus actuator 210 so that the light spot is focused on the recording surface of the optical disc 100. This is the focusing servo.

Based on the tracking error signal, the servo circuit 520 controls the position of the focal point of the light beam in the tracking direction by the tracking drive circuit 320 and tracking actuator 310 so that the light spot follows the recording track on the optical disc 100. This is the tracking servo.

In the optical disc drive taught in Japanese Unexamined Patent Appl. Pub. 2003-132555, the power switching circuit 400 switches appropriately according to the operating conditions of the disc drive between the 5V power supply 162 that outputs 5V, the 12V power supply 161 that outputs 12V, and the 3.3V power supply 163 that outputs 3.3V to supply power to the focusing drive circuit 220 and tracking drive circuit 320 and thereby reduce the power consumption of the optical disc drive.

This optical disc drive thus has a first power supply that supplies a first output voltage to the focusing drive circuit 220 and tracking drive circuit 320 during normal playback and recording conditions, and a second power supply that supplies a second output voltage that is higher than the first output voltage, and at least one of these power supplies is externally sourced. A switching unit switches to the second power supply when actuator drive power must be increased. A third power supply unit for stepping down the power supplied from the first or second power source to a third voltage that is lower than the first power supply voltage is also provided, and the power switching circuit 400 switches the power supply for the focusing drive circuit 220 or tracking drive circuit 320 to this third power supply based a command from the control unit.

The 3.3V power supply 163 that is the third power supply is often a DC-DC step-down converter, and a typical DC-DC step-down converter 23500 is described below with reference to FIG. 2.

This DC-DC step-down converter 23500 has a voltage comparator 23100, a PWM comparator 23200, a switching circuit 23300, and a step-down voltage generator 23400. The voltage comparator 23100 comprises a voltage amplifier 23110, resistance RC, and capacitance CC. The input terminals of the voltage comparator 23100 are the non-inverted input terminal and the inverted input terminal of the voltage amplifier 23110, and the output terminal of the voltage comparator 23100 is the output terminal of the voltage amplifier 23110. The output terminal of the voltage amplifier 23110 is connected to one side of the capacitance CC, the other side of the capacitance CC is connected to one side of the resistance RC, and the other side of the resistance RC is connected to the inverted input terminal of the voltage amplifier 23110.

The output terminal of the voltage comparator 23100 is connected to the inverted input terminal of the PWM comparator 23200, and the sawtooth wave 23210 voltage signal is input to the non-inverted input terminal of the PWM comparator 23200. The output terminal of the PWM comparator 23200 is connected to the control terminal controlling the switching circuit 23300. The switching circuit 23300 uses a pnp transistor 23310 and a regeneration current diode 23320. The emitter terminal of the pnp transistor 23310 is connected to the 5V power supply, and the collector is connected to the cathode terminal of the regeneration current diode 23320 and the input terminal of the next-stage step-down voltage generator 23400. The anode terminal of the regeneration current diode 23320 is to ground.

The step-down voltage generator 23400 comprises a coil L and a charging capacitor CS, and the input terminal is connected to one side of the coil L. One side of the charging capacitor CS is to ground. The other side of the coil L and the other side of the charging capacitor CS are connected to the step-down voltage output terminal of the step-down voltage generator 23400 from which the step-down voltage VC is output. The step-down voltage output terminal is connected to the inverted input terminal of the voltage amplifier 23110 in the voltage comparator 23100, and the 3.3V reference voltage is input to the reference voltage input terminal, which is the non-inverted input terminal of the voltage amplifier 23110 and the input terminal of the DC-DC step-down converter 23500.

Operation of the DC-DC step-down converter 23500 is described below.

The voltage amplifier 23110 compares the reference voltage of 3.3 V with the step-down voltage VC, and steps up the output voltage if the step-down voltage VC is lower than the 3.3V reference voltage to raise the voltage applied to the inverted input terminal of the downstream PWM comparator 23200.

The PWM comparator 23200 compares the voltage of the sawtooth wave 23210 input to the non-inverted input terminal with the inverted input terminal voltage, and outputs a PWM signal with a short pulse width if the inverted input terminal voltage rises. This PWM signal makes the ON period of the switching circuit 23300, which switches the 5V power supply voltage, longer than the OFF period, the step-down voltage generator 23400 thus converts the switched 5V supply voltage to a nearly direct current voltage, and the step-down voltage VC of the step-down voltage output terminal thus rises.

Conversely, if the step-down voltage VC is greater than the 3.3V reference voltage, the output voltage of the voltage amplifier 23110 drops and as a result the step-down voltage VC of the step-down voltage output terminal also drops.

As a result of this negative feedback operation, the DC-DC step-down converter 23500 operates to make the 3.3V reference voltage and the step-down voltage VC nearly equal.

Separately from the above, Japanese Patent 3513062 teaches technology for reducing collisions between the objective lens of the optical disc drive and the disc media. Optical disc drives that uses dual-layer optical disc media such as DVDs use a focus jump technique to control movement and focusing of the laser spot between recording layers in order to read data from two data recording layers from one side of the disc. Focus jump control may fail repeatedly at the same place on the disc as a result of localized scratches on the disc or accelerated disc speed due to disc warping. The technology taught in Japanese Patent 3513062 reduces collisions between the objective lens and disc by stopping jumping where jumping fails repeatedly.

The technology known from the literature as described above provides the power supply voltage of the focusing and tracking drive circuits of the optical disc drive from a first power supply used for normal playback, a second power supply that outputs a higher voltage than the first power supply, and a third power supply that outputs a voltage lower than the first power supply, and switches to the second power supply voltage when faster response is needed. The operating status of the optical disc drive is also analyzed in order to handle varying degrees of disc warping and eccentricity by appropriately switching the power supply voltage between the first, second, and third power supplies, thereby reducing power consumption. However, there is a limit to the degree that power consumption can be reduced using a control method that switches the supply voltage to the focusing and tracking drive circuits in three stages, and the conventional technology described above does not address applying the optimal supply voltage required by the drive circuits for low power consumption.

An object of the present invention is to solve this problem by further reducing power consumption by the drive circuits while also affording fast drive circuit response.

SUMMARY OF THE INVENTION

To achieve these objects, a drive apparatus according to a preferred aspect of the invention is an apparatus operable to supply drive output to an actuator operable to operate a movable head. The drive apparatus comprises a fixed output generator operable to produce a predetermined fixed output; a drive output tracking signal generator operable to detect the drive output required to drive the actuator, and to generate a drive output tracking signal that follows the drive output; a control output generator operable to generate control output slightly greater than the drive output based on the fixed output and the drive output tracking signal; and a drive output generator operable to produce the drive output using the control output.

The minimum control output required to drive the actuator can thus be supplied as the power supply of the drive output generating element that produces the drive output.

The drive apparatus preferably also has a sudden-change-in-drive-output detector operable to detect a sudden change period in which the drive output tracking signal changes suddenly, and the control output generator improves response by outputting a constant output containing no actual change in the fixed output during the sudden change period.

Further preferably, the drive apparatus also has a response improvement not-needed period detector operable to detect response improvement not-needed period in which improved response is not needed. In this aspect of the invention the constant output is not output in the response improvement not-needed period even if a sudden change period is detected.

This aspect of the invention can maintain constant output substantially equal to the fixed output even in the sudden change period. If slower response is desirable in the sudden change period, the control output can be desirably controlled by making the sudden change period a response improvement not-needed period.

In a conventional drive apparatus using a PWM driver, high frequency current switching noise from PWM drive can be picked up in the playback signal from the optical pickup, thus superimposing noise on the focus error signal and tracking error signal. This causes the focusing and tracking operations to malfunction and degrades the error rate of the playback signal.

The drive apparatus of this invention uses linear drive type drive output generating elements, thereby eliminating this problem of the prior art drive apparatus, enabling good focusing and tracking operations, and affording an acceptable error rate.

Furthermore, the conventional drive apparatus divides the operating state of the optical disc drive and switches the supplied supply voltage in three stages between a first power supply, a second power supply, and a third power supply in order to reduce power consumption. There is a limit to the control that can be achieved by simply switching the power supply voltage in three stages, however. The drive apparatus of this invention therefore uses a control output generator to supply power according to the drive output level of the drive output generator. When drive output is high, control output is also high, and when drive output is low, control output is low. This further reduces power consumption and eliminates problems resulting from heat output by the drive IC.

Because a constant output equal to the fixed output can be supplied even when a sudden change in drive output is required due, for example, to the drive apparatus being subjected to mechanical vibration or a disc with excessive warping or eccentricity being inserted, the supply voltage of the drive output generating elements that produce the drive output is sufficiently high and operation with good response can be assured. Furthermore, when a disc with scratches or abnormal surface acceleration due to warping causes focus jumping to fail, response can be delayed and collisions between the objective lens and disc can be reduced by setting a response improvement not-needed period during which improved response is not necessary and the constant output is not output even if a sudden change period is detected.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Outline of the Invention

The present invention is described in summary first below with reference to FIG. 26. The fixed output is the DC power supplied from a 12-V PVCC source.

Drive output (VO1+, VO1−; VO2+, VO2−) produced by the drive output generator (2200, 3200, 5200) is supplied to the actuator (2100, 3100) to operate the movable head (1300). The drive output tracking signal generator (2220) detects the drive output (VO1+, VO1−; VO2+, VO2−) required by the actuator (2100, 3100), and generates drive output tracking signals (VB1, VB2) tracking the drive output (VO1+, VO1−; VO2+, VO2−). The control output generator (2300, 3300, 5300) controls the fixed output generated by the fixed output generator (1610) based on the drive output tracking signals (VB1, VB2), and produces control output (VC1, VC2) that is slightly higher than the drive output (VO1+, VO1−; VO2+, VO2−). The drive output generator (2200, 3200, 5200) uses control output (VC1, VC2) to generate drive output (VO1+, VO1−; VO2+, VO2−).

The lowest control output (VC1, VC2) required to drive the actuator (2100, 3100) can thus be supplied as the power supply of the drive output generator (2200, 3200, 5200) by this arrangement.

The sudden-change-in-drive-output detector (2400, 3400) detects a sudden change period (TVF1) in which there is a sudden change in the drive output tracking signal (VB1, VB2), and the control output generator (2300, 3300, 5300) outputs a constant output (VC1, VC2) in which there is no actual change in the fixed output during the sudden change period (TVF1).

This arrangement can thus supply a constant output (VC1, VC2) substantially equal to the fixed output during the sudden change period (TVF1), and thereby improves the response of the control output generator (2300, 3300, 5300).

A response improvement not-needed period detector (5100) detects a response improvement not-needed period (TA1) in which improved response is not needed. The control output generator (2300, 3300, 5300) does not output the constant output (VC1, VC2) in the response improvement not-needed period (TA1) even if a sudden change period (TVF1) is detected.

If smooth response is desirable even in the sudden change period (TVF1), this arrangement can maintain control output (VC1, VC2) by asserting a response improvement not-needed period (TA1).

Preferred embodiments of this invention are described next below.

First Embodiment

Figure 3:
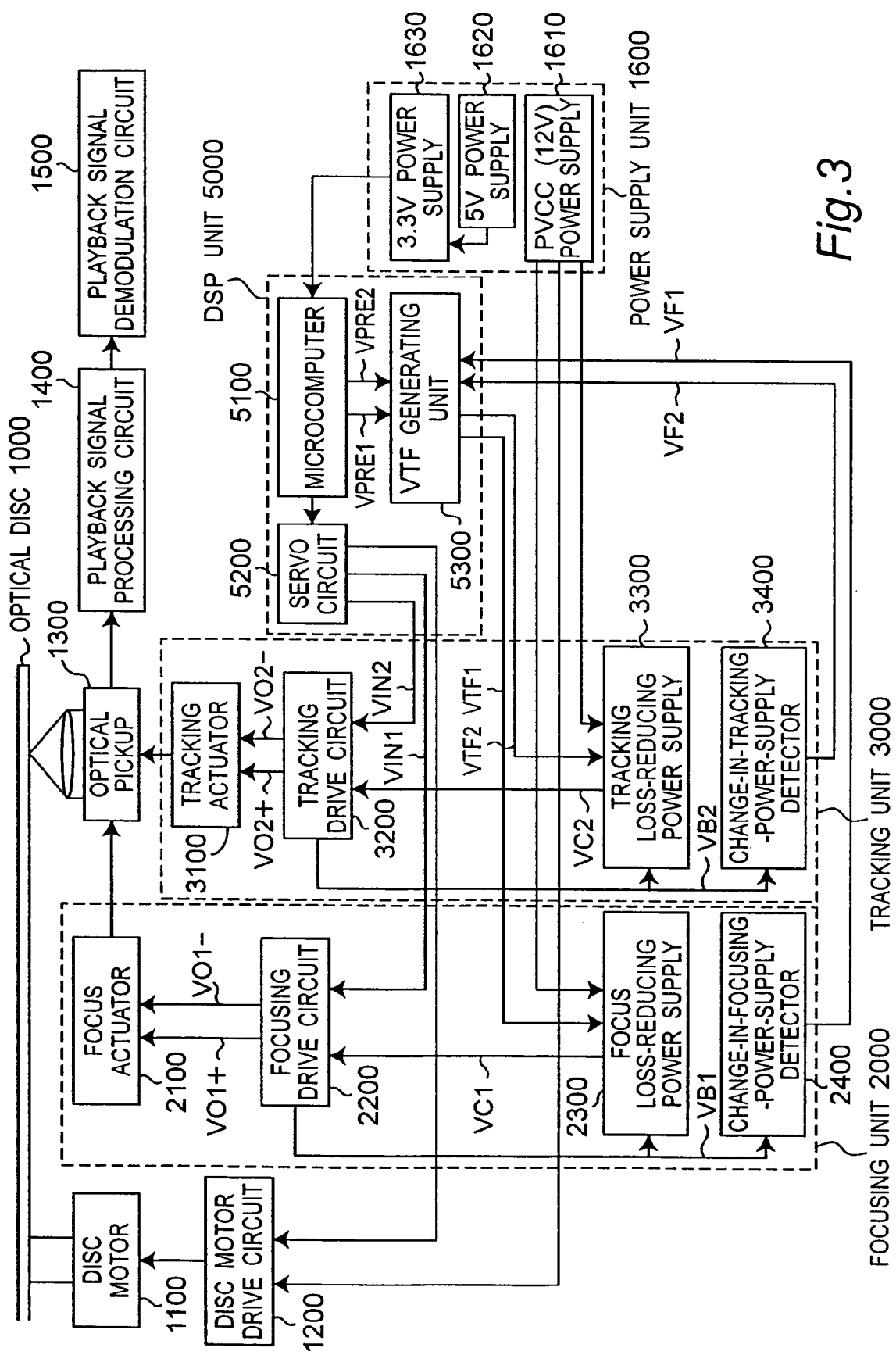
FIG. 3 is a block diagram of a drive apparatus according to a first embodiment of the invention.

FIG. 3 is a block diagram of a drive apparatus according to a first embodiment of the invention.

Referring to FIG. 3, the optical pickup 1300 emits a light beam to the optical disc 1000, and the light reflected from the disc is converted to an electric signal that represents the information on the disc and is output to the playback signal processing circuit 1400. The playback signal processing circuit 1400 adjusts the amplitude of this playback signal, which is then demodulated by the playback signal demodulation circuit 1500 to reproduce the information previously recorded on the optical disc 1000.

The DSP unit 5000 includes a microcomputer 5100 and servo circuit 5200. Rotation of the disc motor 1100 is controlled by the disc motor drive circuit 1200 based on signals output from the servo circuit 5200 according to speed commands from the microcomputer 5100, thereby driving the optical disc 1000 at a specified speed.

The playback signal processing circuit 1400 generates a focus error signal and a tracking error signal. The focus error signal indicates positioning error in the focal point of the laser beam in the focusing direction, and the tracking error signal indicates positioning error in the focal point of the laser beam in the tracking direction.

Based on the focus error signal output by the playback signal processing circuit 1400, the servo circuit 5200 controls the position of the focal point of the light beam in the focusing direction by the focusing drive circuit 2200 and focus actuator 2100 so that the light beam is focused on the recording surface of the optical disc 1000. This is the focusing servo.

Based on the focus error signal output by the playback signal processing circuit 1400, the servo circuit 5200 controls the position of the focal point of the light spot in the focusing direction by the focusing drive circuit 2200 and focus actuator 2100 so that the light spot is focused on the recording surface of the optical disc 1000. This is the focusing servo.

Based on the tracking error signal, the servo circuit 5200 controls the position of the focal point of the light spot in the tracking direction by the tracking drive circuit 3200 and tracking actuator 3100 so that the light spot follows the recording track on the optical disc 1000. This is the tracking servo.

The focusing unit 2000 comprises the focus actuator 2100, focusing drive circuit 2200, focus loss-reducing power supply 2300, and change-in-focusing-power-supply detector 2400. The tracking unit 3000 comprises the tracking actuator 3100, tracking drive circuit 3200, tracking loss-reducing power supply 3300, and change-in-tracking-power-supply detector 3400. The following description of the first embodiment of the invention focuses on the focusing unit 2000, but the arrangement, operation, and benefits afforded by the tracking unit 3000 are the same.

The focusing drive circuit 2200 produces a drive output tracking signal VB1 according to the drive conditions of the focusing drive circuit 2200, and inputs the drive output tracking signal VB1 to the focus loss-reducing power supply 2300. The power supplied to the focus loss-reducing power supply 2300 is the PVCC power supply 1610 with an output voltage of 12V, for example. As a result, the PVCC (12V) power supply 1610 is converted by the focus loss-reducing power supply 2300 to a supply voltage determined by the drive conditions of the focusing drive circuit 2200 and supplied to the focusing drive circuit 2200, thereby reducing the power consumption of the drive apparatus.

While the primary PVCC power source of the focusing drive circuit 2200 is PVCC (12V) power supply 1610 in this example, a 5V power supply 1620 with a 5-V output voltage can be used as the power supply to further reduce power consumption if this lower voltage power source can supply the maximum drive current required by the focusing drive circuit 2200. The PVCC power source is also not limited to 12V or 5V as described here, and can be any desirable voltage.

Figure 26:
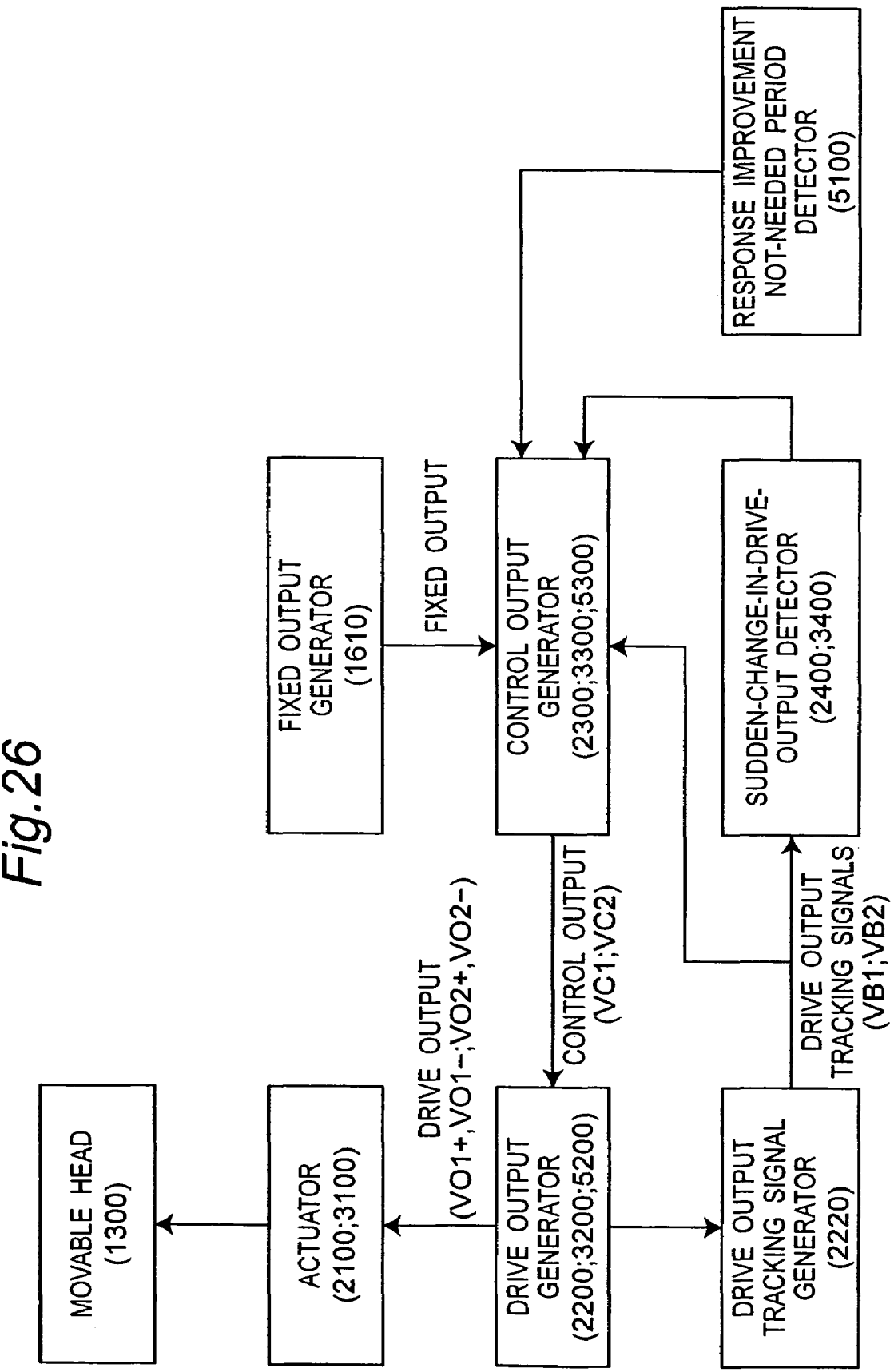
FIG. 26 is a block diagram showing an overview of the invention.

The correlation between this first embodiment of the invention shown in FIG. 3 and the outline of the invention described in FIG. 26 is described below. The movable head shown in FIG. 26 corresponds to the optical pickup 1300; the actuators corresponds to focus actuator 2100 and tracking actuator 3100; the drive output generator corresponds to focusing drive circuit 2200, tracking drive circuit 3200, and servo circuit 5200; the drive output tracking signal generator corresponds to focusing drive circuit 2200, tracking drive circuit 3200, and VB control generator 2220 that is part of each drive circuit; the fixed output generator corresponds to the PVCC (12V) power supply 1610; the control output generator corresponds to focus loss-reducing power supply 2300, tracking loss-reducing power supply 3300, and VTF generating unit 5300; the sudden-change-in-drive-output detector corresponds to change-in-focusing-power-supply detector 2400 and change-in-tracking-power-supply detector 3400; and the response improvement not-needed period detector corresponds to microcomputer 5100.

The drive output generator constitutes both a focusing drive output generator and tracking drive output generator, and the focusing drive output generator corresponds to the focusing drive circuit 2200 and servo circuit 5200, and the tracking drive output generator corresponds to the tracking drive circuit 3200 and servo circuit 5200.

The arrangement of the present invention enables precisely controlling the power supplied to the focusing drive circuit 2200, and can thereby further reduce power consumption.

In addition, a drive apparatus according to the present invention can supply a high supply voltage with good response even when a disc with pronounced warping or eccentricity is inserted, thus has sufficient reserve power, and affords focusing control with excellent tracking characteristics.

This embodiment is described above with particular reference to the focusing unit 2000, but the arrangement, operation, and benefits afforded by the tracking unit 3000 are the same.

Figure 1:
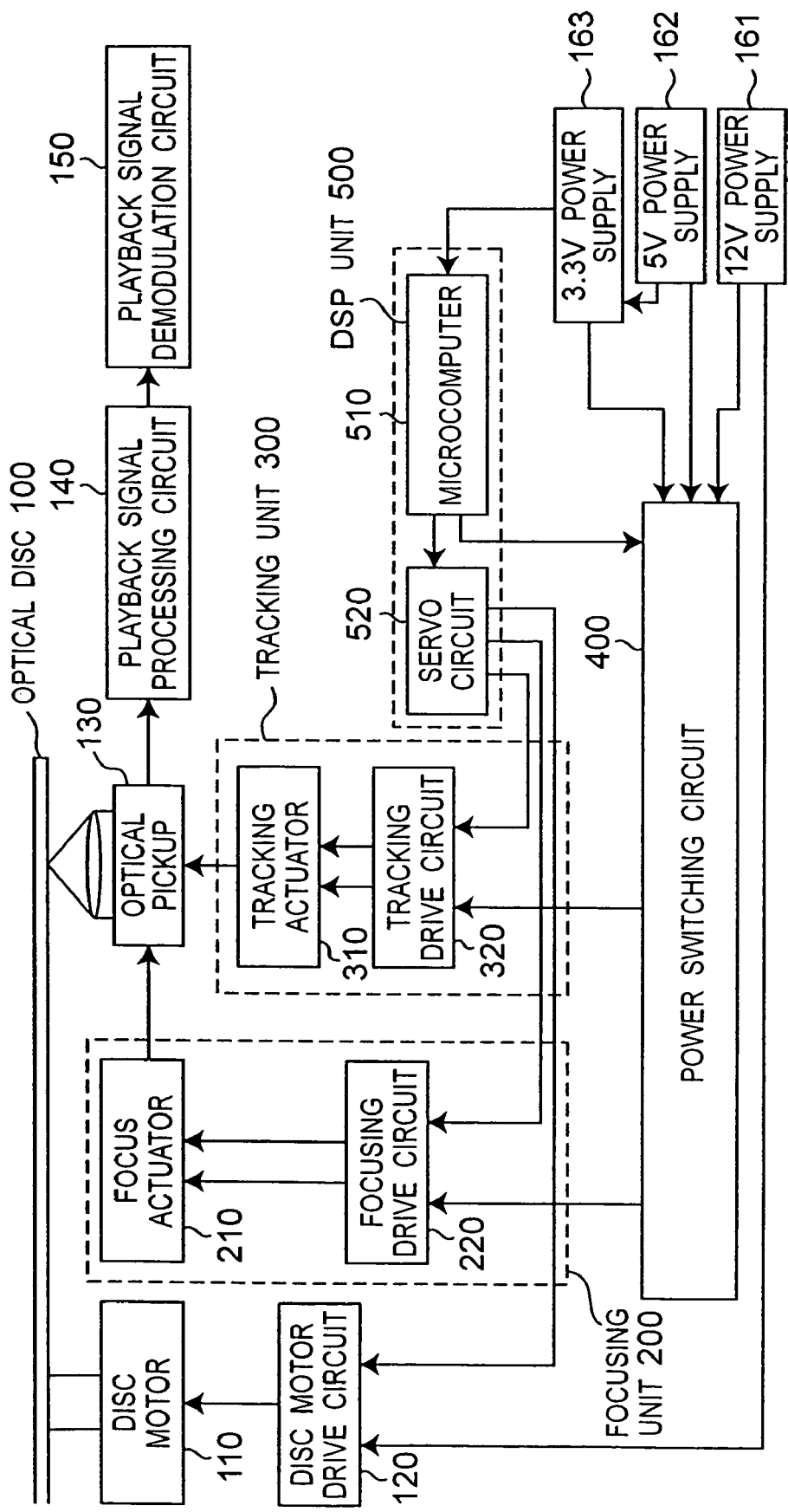
FIG. 1 is a block diagram of a prior art optical disc drive.
Figure 2:
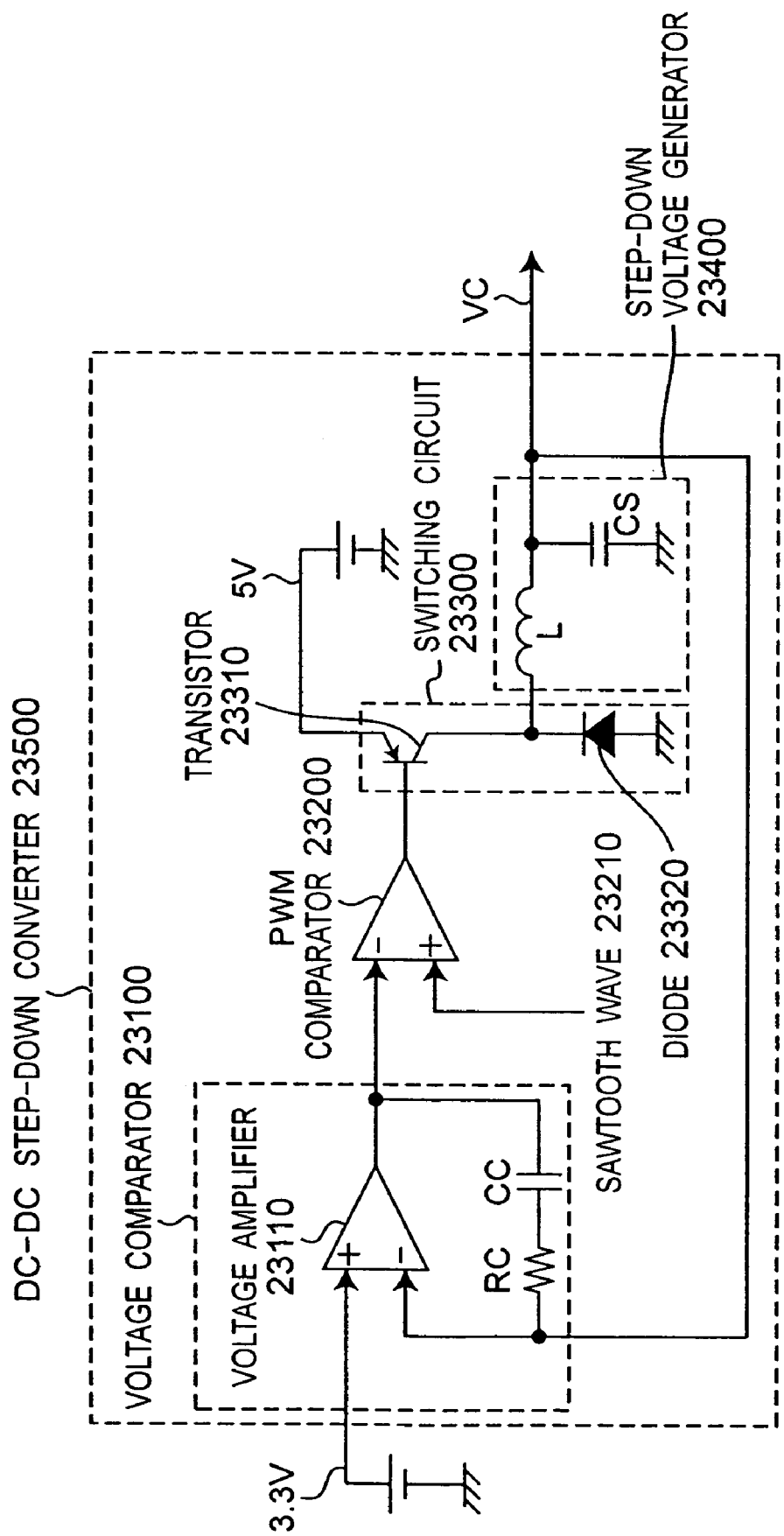
FIG. 2 shows a conventional DC-DC step-down converter that outputs a 3.3V power supply.
Figure 4:
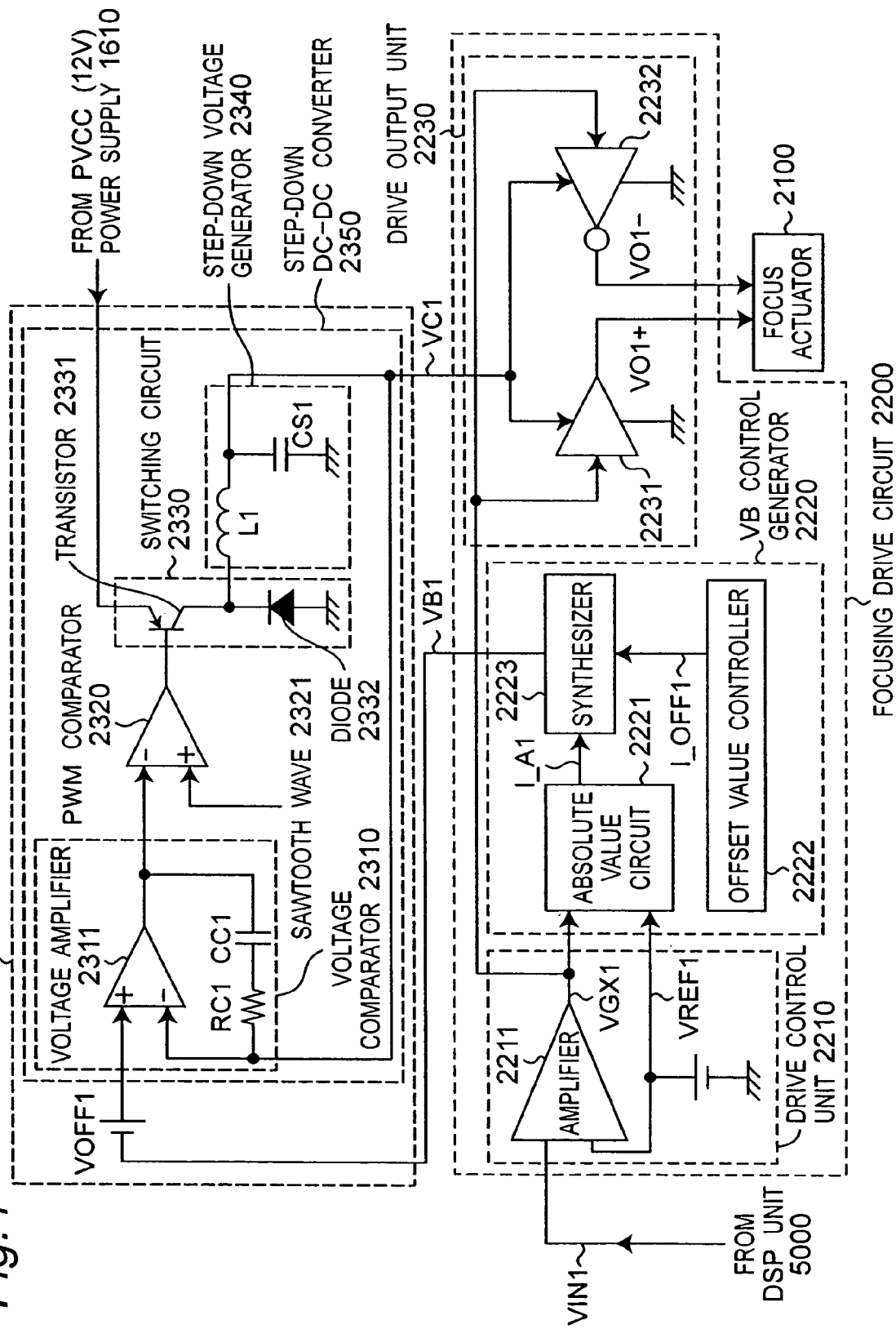
FIG. 4 is a detailed block diagram of a first embodiment of a focusing drive circuit and a first embodiment of a focus loss-reducing power supply in the first embodiment shown in FIG. 3.

First Embodiment of the Focus Drive Circuit and First Embodiment of the Focus Loss-Reducing Power Supply FIG. 4 is a detailed block diagram showing a first embodiment of the focusing drive circuit 2200 and a first embodiment of the focus loss-reducing power supply 2300 shown in FIG. 1.

The focusing drive circuit 2200 comprises a drive control unit 2210, a VB control generator 2220, and a drive output unit 2230, which is an H-bridge arrangement drive output generating elements such as bipolar or MOS transistors. Drivers 2231 and 2231 are each half of this H-bridge construction.

The focus loss-reducing power supply 2300 is the supply power source of the H-bridge drive output unit 2230, and controls the control output VC1 based on the drive output tracking signal VB1 supplied from the VB control generator 2220.

As shown in FIG. 4, drive waveform signal VIN1 containing waveform information for driving the focus actuator 2100 is input from the DSP unit 5000, and amplified by a specific amplifier 2211 in the drive control unit 2210. The amplifier output VGX1 and a first reference voltage VREF1 are input to the VB control generator 2220.

In the VB control generator 2220, the amplifier output VGX1 and first reference voltage VREF1 are merged by the absolute value circuit 2221, offset value controller 2222, and synthesizer 2223, and the result is output as drive output tracking signal VB1 to the focus loss-reducing power supply 2300.

The drive output unit 2230 contains linear drivers 2231 and 2231. Opposite phase drive output VO1+ and VO1− are supplied from the drive output terminals of the drivers 2231 and 2231 to the first and second input terminals of the focus actuator 2100. Drive output VO1+ and VO1− are usually expressed as voltage but could be current.

As shown in the equation below, the difference (VO1+)−(VO1−) between drive output VO1+ and VO1− is acquired as the difference (VIN1−VREF1) of a specific first reference voltage VREF1 subtracted from the drive waveform signal VIN1 of the drive control unit 2210 multiplied by a proportionally constant gain G.

$$\{(VO1+)-(VO1-)\}=G*(VIN1-VREF1)$$

where G>0.

If VIN1>VREF1, then (VO1+)>(VO1−), and if VIN1<VREF1, then (VO1+)<(VO1−).

Figure 5:
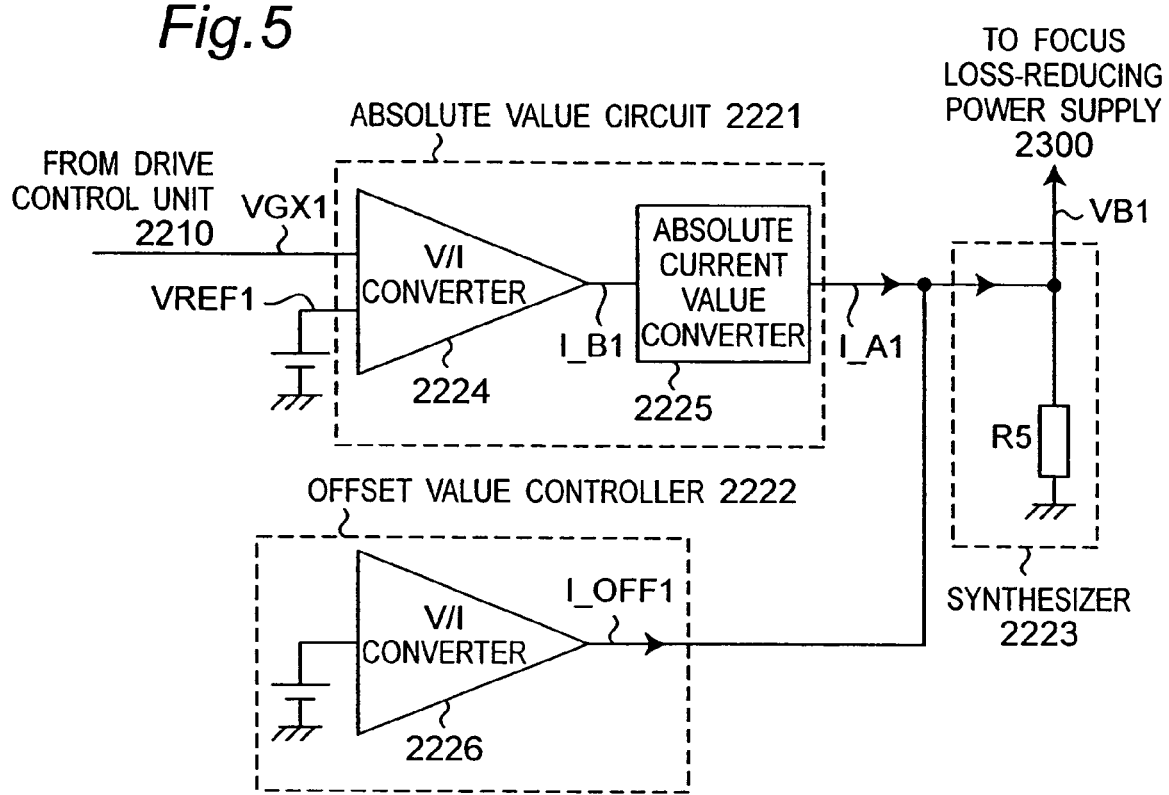
FIG. 5 is a detailed block diagram of the VB control generator in the focusing drive circuit shown in FIG. 4.
Figure 6A:
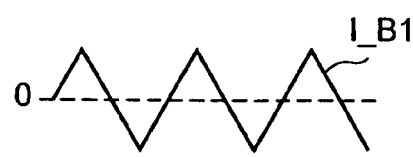
FIG. 6A is a waveform diagram showing the change in time in main signals shown in FIG. 5.
Figure 6B:
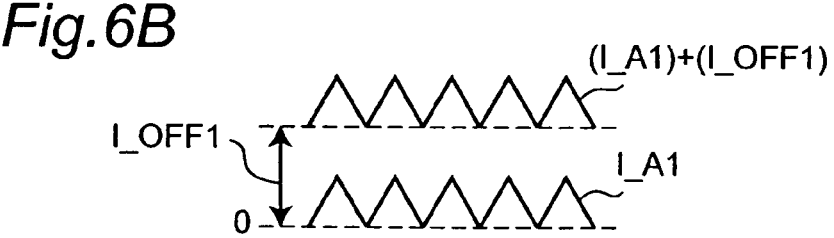
FIG. 6B is a waveform diagram showing the change in time in main signals shown in FIG. 5.

FIG. 5 is a detailed block diagram of the VB control generator 2220 contained in the focusing drive circuit 2200 shown in FIG. 4. FIG. 6A and FIG. 6B are waveform diagrams showing the time change in major signals shown in FIG. 5.

The amplifier output VGX1 from drive control unit 2210 is input to the absolute value circuit 2221, and the voltage difference between amplifier output VGX1 and first reference voltage VREF1 is converted to current by V/I converter 2224. The absolute current value converter 2225 determines the absolute value of the current I_B1 output from the V/I converter 2224, and outputs current I_A1.

The V/I converter 2226 in the offset value controller 2222 converts a predetermined voltage to current and outputs current I_OFF1. This current I_OFF1 is added to current I_A1, and the combined current (I_A1)+(I_OFF1) flows to the resistance R5 in the synthesizer 2223.

FIG. 6A schematically shows the waveform of current I_B1, and FIG. 6B schematically shows the current I_A1 resulting from the absolute value conversion of current I_B1, and the current (I_A1)+(I_OFF1) combining current I_A1 and current I_OFF1. The voltage of both ends of the resistance R5 is drive output tracking signal VB1, which is output to the focus loss-reducing power supply 2300.

The focusing drive circuit described above thus generates the drive output tracking signal VB1 controlling the control output VC1 of the focus loss-reducing power supply 2300.

A first embodiment of the focus loss-reducing power supply 2300 is shown in the step-down DC-DC converter 2350 shown in FIG. 4.

This step-down DC-DC converter 2350 is composed of a voltage comparator 2310, PWM comparator 2320, switching circuit 2330, and step-down voltage generator 2340.

The voltage comparator 2310 is composed of a voltage amplifier 2311, resistance RC1, and capacitance CC1. The input terminals of the voltage comparator 2310 are the non-inverted input terminal and inverted input terminal of the voltage amplifier 2311, and the output terminal of the voltage comparator 2310 is the output terminal of the voltage amplifier 2311. The output terminal of the voltage amplifier 2311 is connected to one side of the capacitance CC1, the other end of the capacitance CC1 is connected to one side of the resistance RC1, and the other side of the resistance RC1 is connected to the inverted input terminal of the voltage amplifier 2311.

The output terminal of the voltage comparator 2310 is connected to the inverted input terminal of the PWM comparator 2320, and the sawtooth wave 2321 voltage signal is input to the non-inverted input terminal of the PWM comparator 2320. The output terminal of the PWM comparator 2320 is connected to the control terminal for controlling the switching circuit 2330.

The switching circuit 2330 in this embodiment is composed of a pnp transistor 2331 and a regeneration current diode 2332. The emitter of the transistor 2331 is connected to the fixed output PVCC (12V) power supply 1610, and the collector is connected to the cathode of the regeneration current diode 2332, of which the anode is to ground, and the input terminal of the downstream step-down voltage generator 2340.

The step-down voltage generator 2340 comprises a coil L1 and a charging capacitor CS1. The input terminal is connected to one side of the coil L1, and one side of the charging capacitor CS1 is to ground. The other side of the coil L1 and the other side of the charging capacitor CS1 are connected to the output terminal of the step-down voltage generator 2340, which is the control output terminal that outputs control output VC1. The control output terminal is connected to the inverted input terminal of the voltage amplifier 2311 in the voltage comparator 2310, and a second reference voltage is input to reference voltage input terminal, which is the non-inverted input terminal of the voltage amplifier 2311 and the input terminal of the step-down DC-DC converter 2350.

Operation of this step-down DC-DC converter 2350 is described below.

The voltage amplifier 2311 compares the second reference voltage and control output VC1, and if the control output VC1 is less than the second reference voltage boosts the output voltage and thus raises the inverted input terminal voltage of the PWM comparator 2320.

The PWM comparator 2320 compares the voltage of the sawtooth wave 2321 input to the non-inverted input terminal with the inverted input terminal voltage, and outputs a PWM signal with a short pulse width if the inverted input terminal voltage rises. This PWM signal makes the ON period of the switching circuit 2330, which switches the fixed output, longer than the OFF period, and the step-down voltage generator 2340 thus converts the switched fixed output to control output VC1, which is nearly direct current. As a result, the control output VC1 of the output terminal rises.

Conversely, if the control output VC1 is greater than the second reference voltage, the output voltage of the voltage amplifier 2311 drops and the control output VC1 of the control output terminal drops as a result.

As a result of this negative feedback operation, the step-down DC-DC converter 2350 operates to make the second reference voltage and the control output VC1 the same voltage.

Therefore, if the combined voltage of the drive output tracking signal VB1 and the tracking signal offset voltage VOFF1 is input as the second reference voltage to the reference voltage input terminal, which is the input terminal of the step-down DC-DC converter 2350 inside the focus loss-reducing power supply 2300, the voltage of the control output VC1 of the fixed output PVCC (12V) power supply 1610 is stepped down to equal this voltage sum. In addition, if the drive output tracking signal VB1 varies according to the drive waveform signal VIN1, control output VC1 also changes according to the change in drive output tracking signal VB1.

The step-down DC-DC converter 2350 thus comprises a voltage comparator 2310 that compares the second reference voltage with the output voltage (control output VC1) of the step-down DC-DC converter 2350 and outputs the voltage difference, a PWM comparator 2320 that converts this voltage difference to a PWM signal, a switching circuit 2330 that switches the fixed output based on the PWM signal, and a step-down voltage generator 2340 that converts the switched fixed output to control output VC1.

The step-down voltage generator 2340 comprises coil L1 and charging capacitor CS1. The step-down DC-DC converter 2350 is characterized by outputting the control output VC1 from the control output terminal to which the coil L1 and charging capacitor CS1 are connected. The transistor 2331 and diode 2332 composing the switching circuit 2330 shown in FIG. 4 can be replaced by two MOS power transistors, and the two MOS power transistors can be operated using a synchronous rectifier method. In this case the PWM comparator 2320 is arranged to control these two synchronous rectifier MOS power transistors as described above.

Figure 7A:
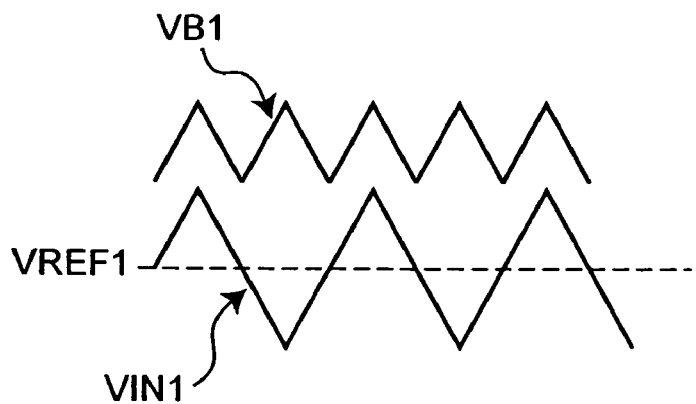
FIG. 7A is a waveform diagram of the drive waveform signal VIN1, first reference voltage VREF1, and drive output tracking signal VB1 shown in FIG. 4.
Figure 7B:
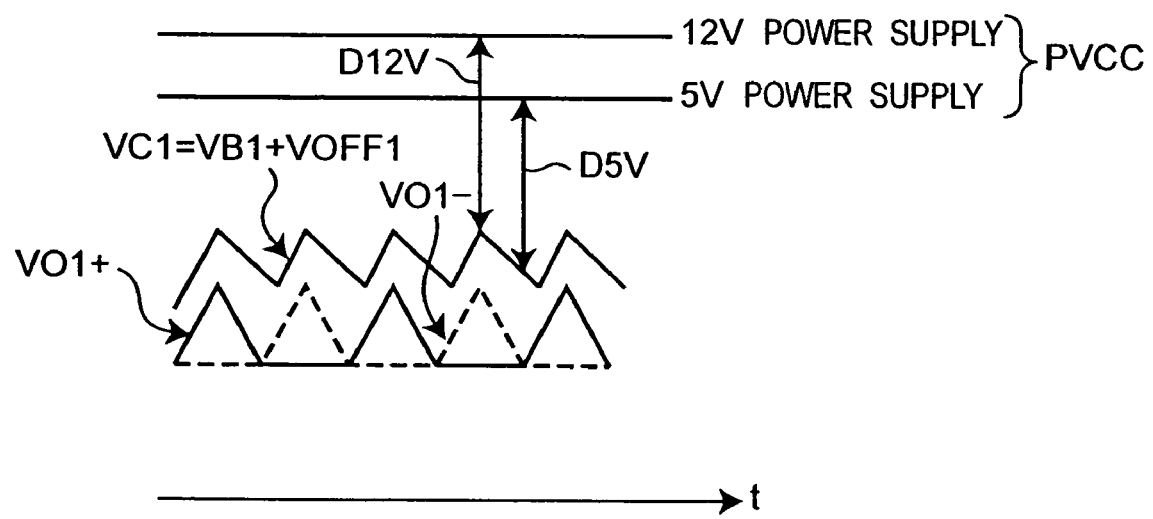
FIG. 7B is a waveform diagram of the control output VC1 and drive outputs VO1+ and VO1− shown in FIG. 4.

FIG. 7A is a waveform diagram of the drive output tracking signal VB1, first reference voltage VREF1, and drive waveform signal VIN1 shown in FIG. 4. FIG. 7B is a waveform diagram of the control output VC1 and drive outputs VO1+ and VO1− shown in FIG. 4. Voltage is on the y-axis in both FIG. 7A and FIG. 7B, and the fixed output PVCC (12V) power supply 1610, control output VC1, and drive outputs VO1+ and VO1− are each expressed in volts. Note that the y-axis could indicate current, and the fixed output, control output VC1, and drive outputs VO1+ and VO1− could be expressed as current.

As will be known from the arrangement described above, the drive output tracking signal VB1 shown in FIG. 7A takes the absolute value of drive waveform signal VIN1 relative to the first reference voltage VREF1 added to a predetermined baseline voltage. The second reference voltage at the reference voltage input terminal of the step-down DC-DC converter 2350 is then VB1+VOFF1.

As a result, the control output VC1 tracking the second reference voltage is expressed as VB1+VOFF1 as shown in FIG. 7B. The control output VC1 wave is therefore slightly larger than drive output VO1+ and VO1− following the peak drive outputs VO1+ and VO1−, which are output in a balanced mode by the drive output generating elements.

What the control output VC1 wave being slight larger than drive output VO1+ and VO1− means is described next. From one perspective, the control output VC1 wave is slightly higher than drive output VO1+ and VO1− and the waveforms are roughly the same near the peak of the drive output VO1+ and VO1− as shown in FIG. 7B. Thus, if the tracking signal offset voltage VOFF1 is set appropriately (to zero or any appropriate positive or negative level), the tracking signal offset voltage VOFF1 can be minimized without adversely affecting the drive output VO1+ and VO1− produced by the drive output generating element, and power consumption and heat emission by the line drive output element can be reduced an amount equivalent to the difference from PVCC (D12V if using a 12V power supply, D5V if using a 5V power supply).

Figure 8:
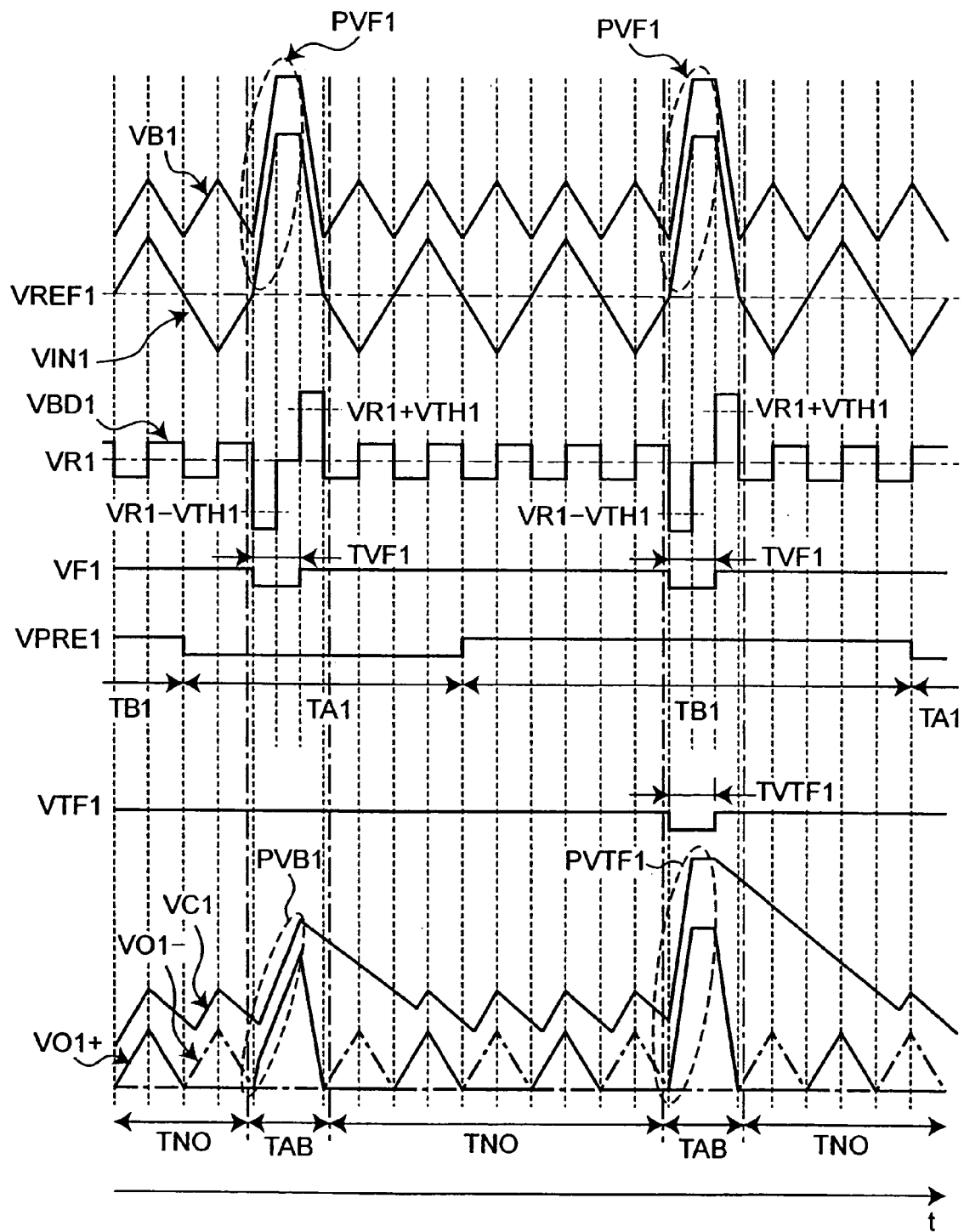
FIG. 8 describes the operation of the main signals in the present invention.

Related parts are described with reference to FIG. 8. FIG. 8 schematically describes the operation of main signals in the present invention with voltage shown on the y-axis and time t on the x-axis. Note that current could be shown on the y-axis and the main signals shown in FIG. 8 could be expressed in terms of current. FIG. 8 shows the change over time in the waveform of the drive waveform signal VIN1 of the focusing drive circuit 2200, the first reference voltage VREF1 of the focusing drive circuit 2200, and the drive output tracking signal VB1 that is output from focusing drive circuit 2200 and input to focus loss-reducing power supply 2300.

As shown in the bottom part of FIG. 8, the time axis is divided into a normal operating period TNO and an abnormal operating period TAB. The abnormal operating period TAB corresponds to when the drive apparatus is subjected to mechanical vibration, or a disc with excessive warp or eccentricity is loaded, for example.

During normal operating period TNO, drive waveform signal VIN1 from DSP unit 5000 changes rises and falls normally relative to first reference voltage VREF1. As shown in FIG. 7A, the drive output tracking signal VB1 also varies according to drive waveform signal VIN1 so that drive output tracking signal VB1 does not go higher than necessary.

During abnormal operating period TAB, the amplitude of drive waveform signal VIN1 immediately goes high either positively or negatively to first reference voltage VREF1 in response to a command from the DSP unit 5000. In this example drive waveform signal VIN1 rises in the positive direction as indicated by dotted line PVF1 in FIG. 8. As a result of the drive waveform signal VIN1 rising suddenly, the difference (VO1+)−(VO1−) between the drive outputs of the focusing drive circuit 2200 rises sharply proportionally to VIN1−VREF1 as controlled by the DSP unit 5000, causing the focus actuator 2100 to operate as instructed by the DSP unit 5000. The drive output tracking signal VB1 follows this sudden rise as indicated by dotted line PVF1.

A power supply only slightly greater than the peak drive output required to drive the focus actuator 2100 and tracking actuator 3100 is therefore sufficient, and a significant reduction in power consumption and a significant reduction in heat output can be achieved.

Second Embodiment of the Focusing Drive Circuit

Figure 9:
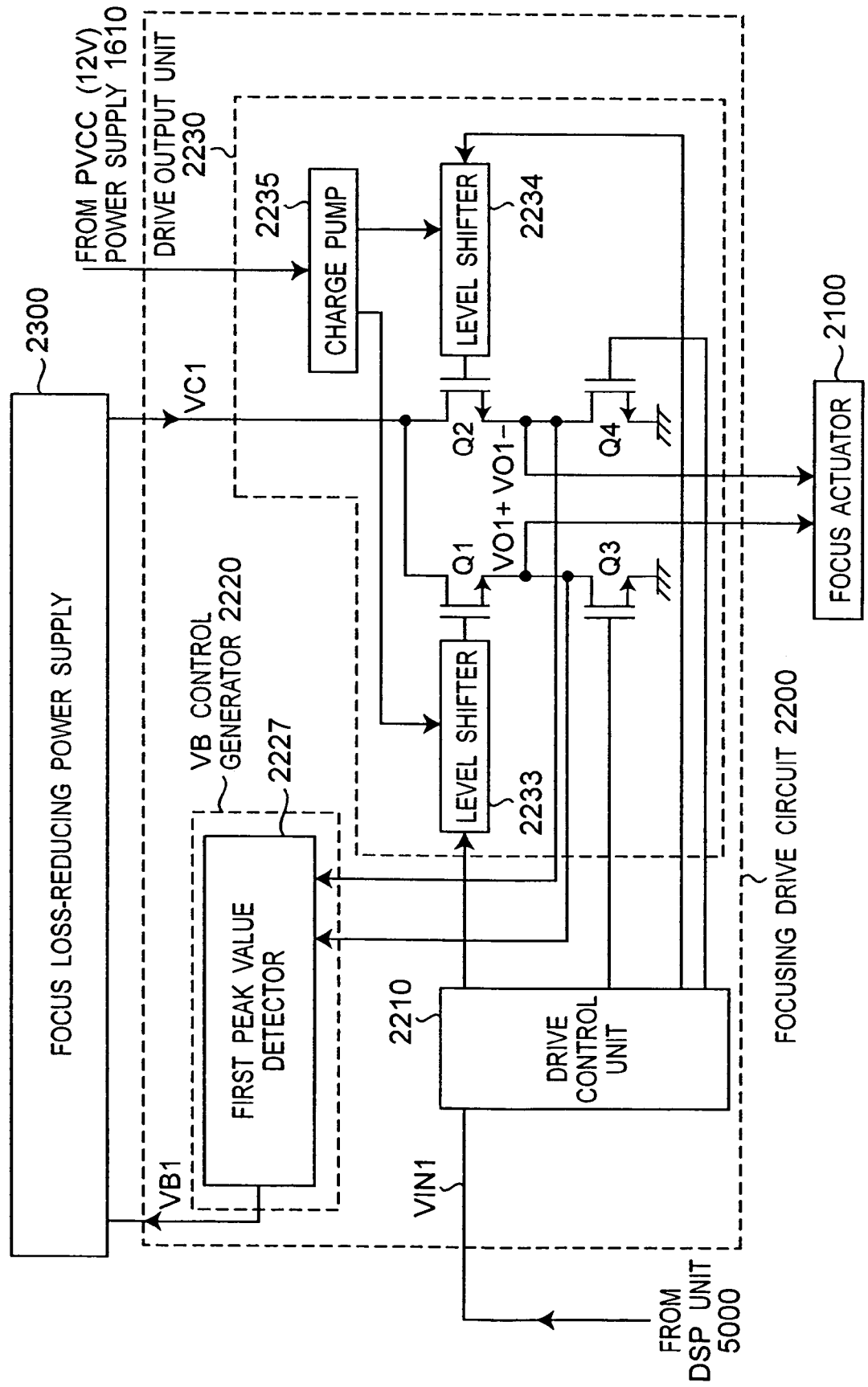
FIG. 9 is a detailed block diagram of a second embodiment of a focusing drive circuit in the first embodiment shown in FIG. 3.

FIG. 9 is a detailed block diagram of a second embodiment of the focusing drive circuit 2200 in the first embodiment of the invention shown in FIG. 3.

This second embodiment of the focusing drive circuit 2200 is composed of drive control unit 2210, VB control generator 2220, and drive output unit 2230. The drive output unit 2230 is composed of four linear drive output generating elements, which are n-channel MOS transistors in this example, in an H bridge arrangement; level shifters 2233 and 2234 for driving the gate voltage of the n-channel MOS transistors; and a charge pump 2235 for supplying power to the level shifters 2233 and 2234 based on the voltage from the PVCC (12V) power supply 1610.

The VB control generator 2220 includes a first peak value detector 2227, and the drive output tracking signal VB1 output from the first peak value detector 2227 is supplied to focus loss-reducing power supply 2300. The control output VC1 is controlled according to drive output tracking signal VB1.

The H bridge is composed of two n-channel MOS transistors Q1 and Q2 shown on the top in FIG. 9, and two n-channel MOS transistors Q3 and Q4 on the bottom. The node between the Q1 source and the Q3 drain, and the node between the Q2 source and Q4 drain, are the drive output terminals. The drive outputs VO1+ and VO1− are output from these two drive output terminals to the first and second input terminals of the focus actuator 2100.

Figure 10:
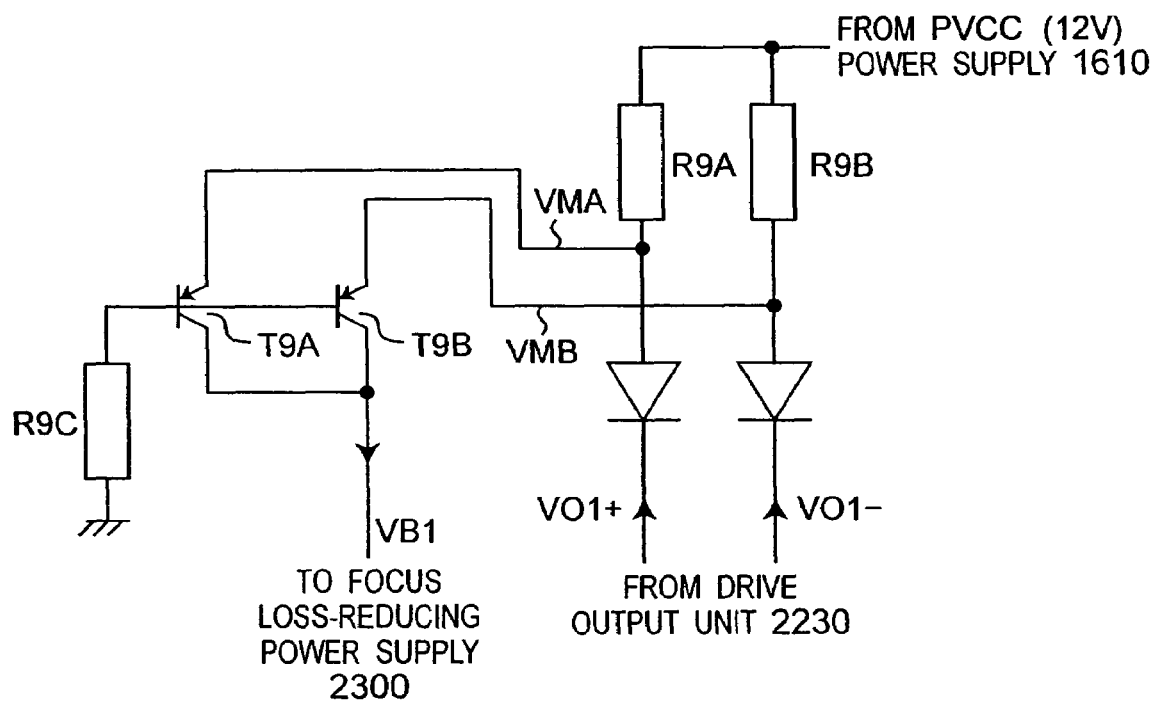
FIG. 10 is a circuit diagram of the first peak value detector shown in FIG. 9.

FIG. 10 is a circuit diagram of the first peak value detector 2227 shown in FIG. 9. In FIG. 10 drive outputs VO1+ and VO1− shown in FIG. 9 are boosted by the diode voltage and then detected as voltages VMA and VMB, and voltage VMA and voltage VMB are input to transistors T9A and T9B, respectively. Because the bases of transistors T9A and T9B go to a common ground through resistance R9C, voltage VMA and voltage VMB are compared, and the higher voltage is output as drive output tracking signal VB1 to the focus loss-reducing power supply 2300. That is, drive output tracking signal VB1 is a signal equal to the peak value of these two voltages VMA and VMB.

Because the control output VC1 of the focus loss-reducing power supply 2300 is thus the supply voltage to the drive output generating elements Q1, Q2, Q3, Q4 of the focusing drive circuit, the power consumption and heat output of the linear drive output generating elements (n-channel MOS transistors in this embodiment of the invention) can be suppressed by appropriately setting the tracking signal offset voltage VOFF1 level (to zero or an appropriate positive or negative value) while being able to supply the current needed to drive the focus actuator 2100.

Third Embodiment of the Focusing Drive Circuit

Figure 11:
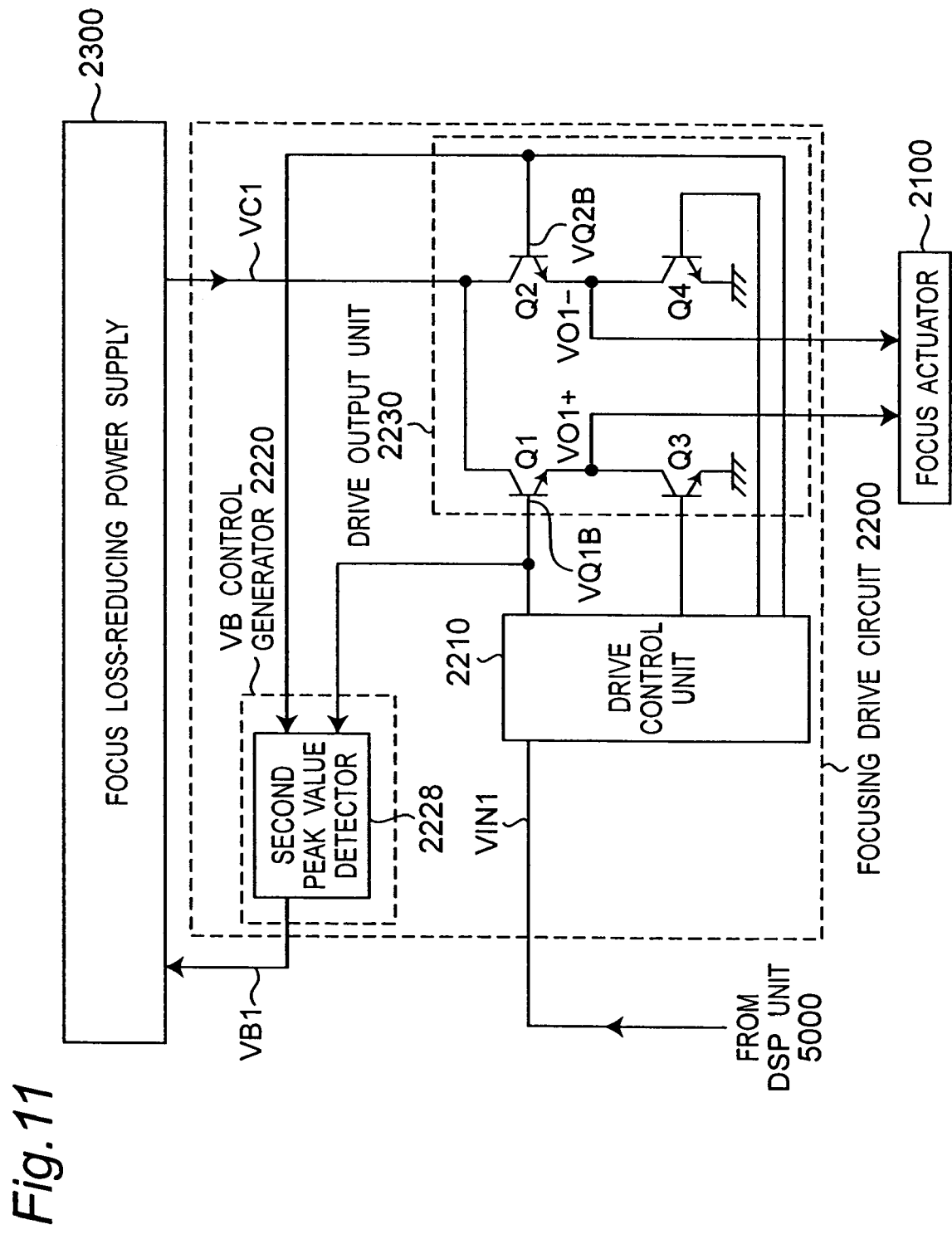
FIG. 11 is a detailed block diagram of a third embodiment of a focusing drive circuit in the first embodiment shown in FIG. 3.

FIG. 11 is a detailed block diagram showing a third embodiment of the focusing drive circuit 2200 in the first embodiment of the invention shown in FIG. 1. This focusing drive circuit 2200 comprises drive control unit 2210, VB control generator 2220, and drive output unit 2230. The drive output unit 2230 is an H-bridge arrangement of npn transistors Q1, Q2, Q3, Q4, which are the linear drive output generating elements.

The VB control generator 2220 comprises a second peak value detector 2228, and the drive output tracking signal VB1 output from the second peak value detector 2228 is supplied to the focus loss-reducing power supply 2300. The control output VC1 is controlled according to drive output tracking signal VB1.

The H bridge is composed of two npn transistors Q1 and Q2 shown on the top, and two npn transistors Q3 and Q4 on the bottom. The node between the Q1 emitter and the Q3 collector, and the node between the Q2 emitter and Q4 collector, are the drive output terminals. The drive outputs VO1+ and VO1− are output from these two drive output terminals to the first and second input terminals of the focus actuator 2100.

The base voltage VQ1B of transistor Q1 in FIG. 11 is greater than the drive output VO1+ by the voltage between the base and emitter of Q1, and base voltage VQ2B of transistor Q2 is greater than the drive output VO1− by the voltage between the base and emitter of Q2.

Figure 12:
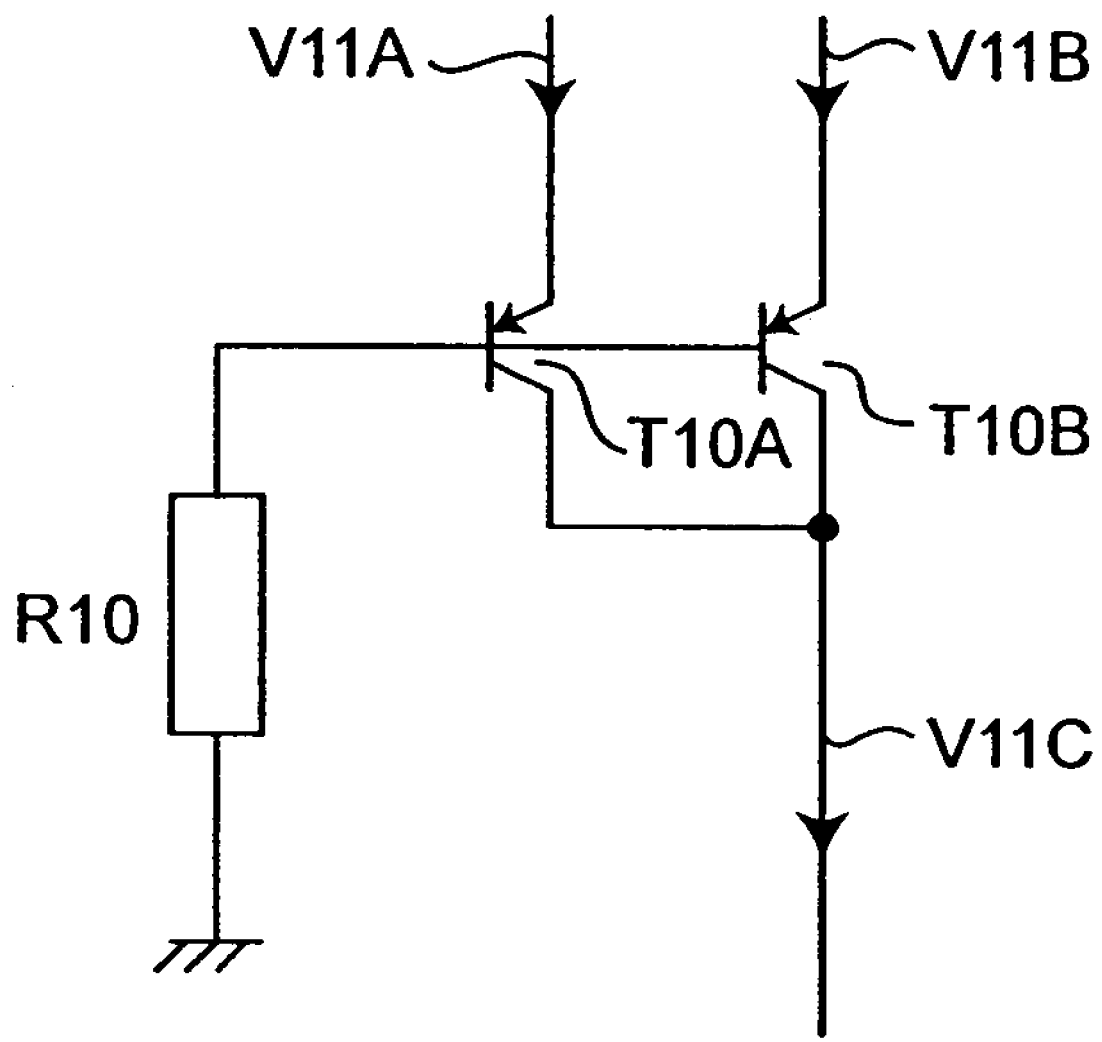
FIG. 12 is a circuit diagram of the second peak value detector shown in FIG. 11.

FIG. 12 is a circuit diagram of the second peak value detector 2228 shown in FIG. 11. The second peak value detector 2228 is the same as the latter part of the first peak value detector 2227 in FIG. 10, and voltage VQ1B and voltage VQ2B in FIG. 11 are applied as the emitter terminal voltages V11A and V11B of transistors T10A and T10B in FIG. 12. Because the base terminals of transistors T10A and T10B go to a common ground through resistance R10, voltage V11A and voltage V11B are compared, and the peak value is output to transistors T10A and T10B as a common collector voltage V11C. This collector voltage V11C is the drive output tracking signal VB1 shown in FIG. 11, and is output to the focus loss-reducing power supply 2300. That is, drive output tracking signal VB1 is a signal equal to the peak value of these two voltages VMA and VMB.

As in the second embodiment shown in FIG. 9, the power consumption and heat output of the linear drive output generating elements (npn transistors in this embodiment of the invention) can be suppressed by appropriately setting the tracking signal offset voltage VOFF1 level (to zero or an appropriate positive or negative value) while being able to supply the current needed to drive the focus actuator 2100.

The first, second, and third embodiments of the focusing drive circuit shown in FIG. 4, FIG. 9, and FIG. 11, respectively, are compared below.

In the first embodiment the drive output tracking signal VB1 is generated in an open loop. In the second and third embodiments, however, drive output tracking signal VB1 is produced with feedback from the drive output unit 2230 being controlled, and signal generation is thus done in a closed loop.

In order to drive the focus actuator 2100 with fast response according to the drive conditions of the focusing drive circuit 2200, it is also necessary to know the required supply power characteristics of the focusing drive circuit 2200 and information from the servo circuit 5200 about previous operation as early as possible. As a result, the first embodiment can detect the drive output tracking signal VB1 with better response than can the second and third embodiments. The third embodiment detects the drive output tracking signal VB1 from the base nodes of the drive output generating elements, and can thus detect the drive output tracking signal VB1 slightly sooner than the second embodiment can detect the drive output of the drive output generating elements.

Change-in-focusing-power-supply Detector

The first, second, and third embodiments of a focusing drive circuit 2200 and the focus loss-reducing power supply 2300 described above can sufficiently supply the current required to drive the focus actuator 2100 with good response during the normal operating period TNO, but the response of the focus loss-reducing power supply 2300 may not be sufficient in the abnormal operating period TAB depending upon the circumstances. This is because the phase compensation filter composed of the capacitance CC1 and resistance RC1 connected to the voltage amplifier 2311 in the focus loss-reducing power supply 2300 prevents the switching circuit 2330 from switching on suddenly when the drive output tracking signal VB1 changes suddenly even if the control output VC1 is driven to change suddenly according to the drive output tracking signal VB1. The change-in-focusing-power-supply detector 2400 therefore detects sudden-change-in-drive-output signal VF1 denoting a sudden change in the drive output tracking signal VB1 in the abnormal operating period TAB, and then uses this sudden-change-in-drive-output signal VF1 to improve the response of the focus loss-reducing power supply 2300.

Figure 13:
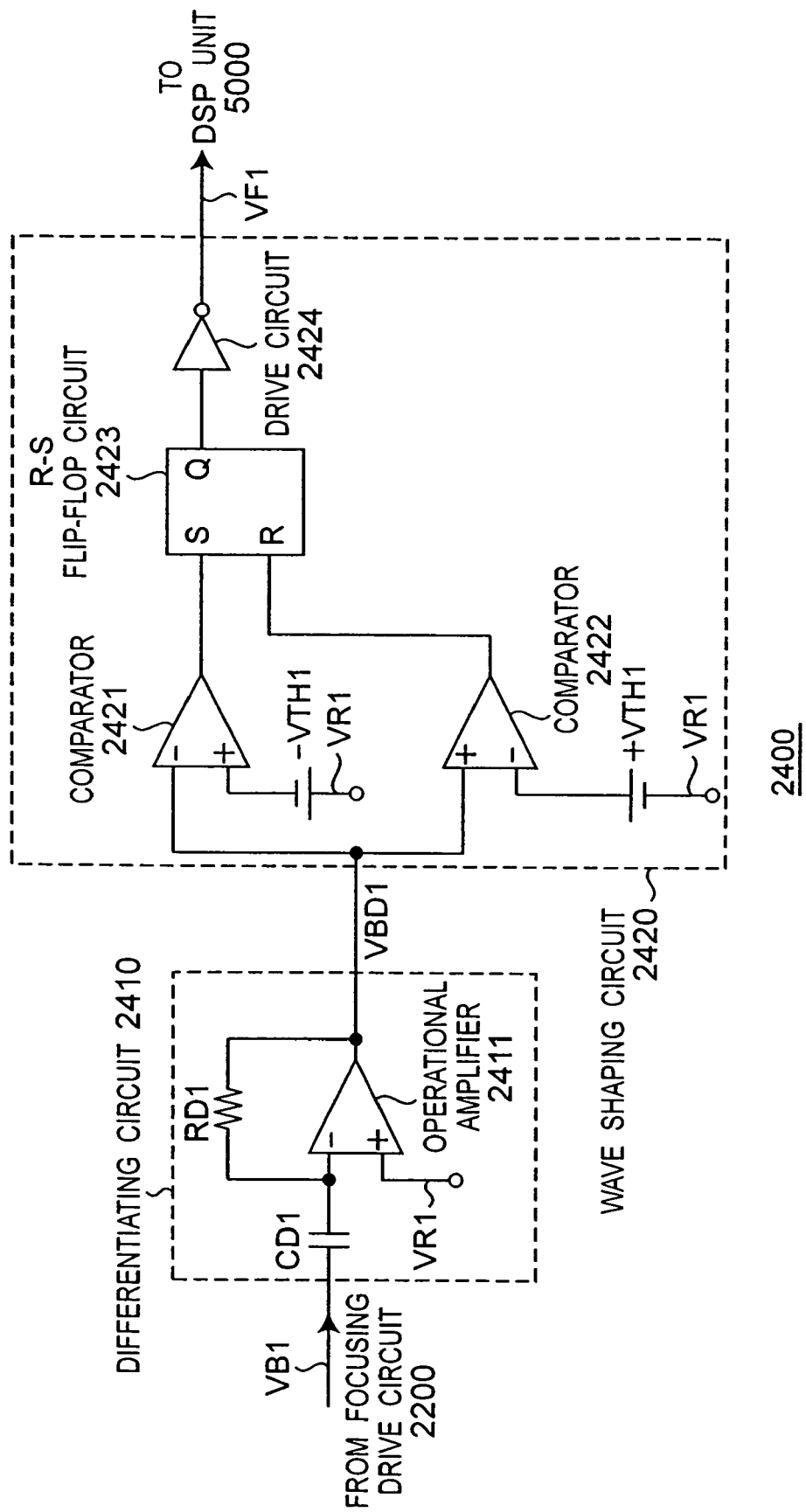
FIG. 13 is a circuit diagram of the change-in-focusing-power-supply detector in the first embodiment shown in FIG. 3.

FIG. 13 is a circuit diagram of the change-in-focusing-power-supply detector 2400 in the first embodiment shown in FIG. 3. As shown in FIG. 13, the change-in-focusing-power-supply detector 2400 comprises differentiating circuit 2410 and wave shaping circuit 2420. The drive output tracking signal VB1 from focusing drive circuit 2200 is input to the differentiating circuit 2410. The differentiating circuit 2410 includes an operational amplifier 2411. The non-inverted input terminal of the operational amplifier 2411 is connected to a predetermined differentiating reference voltage VR1, and the inverted input terminal is connected to one side of capacitance CD1 and one side of resistance RD1. The other side of capacitance CD1 is the input terminal of the differentiating circuit 2410, and the other side of resistance RD1 is connected to the output terminal of operational amplifier 2411, which is the output terminal of the differentiating circuit 2410.

When the voltage of the input drive output tracking signal VB1 has a certain slope, current equal to the value of capacitance CD1 times the time differential of drive output tracking signal VB1 flows through capacitance CD1. This current passes through resistance RD1 and flows to the output terminal of operational amplifier 2411. The non-inverted input terminal of the operational amplifier 2411 is virtually connected to the differentiating reference voltage VR1, that is, the input voltage to the non-inverted input terminal, and the output voltage VBD1 can thus be obtained from the following equation.

$$VBD1 = VR1 - RD1 * CD1 * (dVB1/dt)$$

The wave shaping circuit 2420 comprises two comparators 2421 and 2422, R-S flip-flop circuit 2423, and drive circuit 2424.

The differentiating reference voltage VR1 plus a predetermined offset voltage −VTH1 is applied to the non-inverted input terminal of comparator 2421, and the output voltage VBD1 of differentiating circuit 2410 is applied to the inverted input terminal. The differentiating reference voltage VR1 plus a predetermined offset voltage +VTH1 is applied to the non-inverted input terminal of comparator 2422, and the output voltage VBD1 of differentiating circuit 2410 is applied to the inverted input terminal.

The output terminal of comparator 2422 is connected to the reset terminal of R-S flip-flop circuit 2423, and the output terminal Q of R-S flip-flop circuit 2423 is connected to the input terminal of drive circuit 2424.

The drive circuit 2424 applies sufficient drive current relative to the signal from the Q output terminal of the R-S flip-flop circuit 2423 at the interface to the DSP unit 5000. The output of the drive circuit 2424 is the output of the change-in-focusing-power-supply detector 2400, and is output as sudden-change-in-drive-output signal VF1 to the DSP unit 5000.

The operation of the arrangement shown in FIG. 13 is described with reference to FIG. 8.

In FIG. 8 the drive output tracking signal VB1, output voltage VBD1, and sudden-change-in-drive-output signal VF1 waveforms are shown on time axis t.

The drive output tracking signal VB1 is differentiated by the differentiating circuit 2410 in FIG. 13, resulting in output voltage VBD1 centered on differentiating reference voltage VR1 as shown in FIG. 8. If output voltage VBD1 drops below threshold potential VR1-VTH1 in response to the rapid rise in drive output tracking signal VB1 as indicated by dotted line PVF1, the S input terminal of R-S flip-flop circuit 2423 goes HIGH and the R input terminal goes LOW, and the wave shaping circuit 2420 thus causes the sudden-change-in-drive-output signal VF1 of the change-in-focusing-power-supply detector 2400 to go LOW. If the output voltage VBD1 goes to the same level as differentiating reference voltage VR1, the S input terminal goes LOW and the R input terminal goes LOW, and the logic level is therefore held LOW.

Furthermore, if the output voltage VBD1 rises above threshold potential VR1+VTH1 due to a sharp drop in drive output tracking signal VB1, the S input terminal goes LOW and the R input terminal goes HIGH, and sudden-change-in-drive-output signal VF1 therefore goes HIGH. Thereafter operation continues between these two threshold potential levels and the logic level therefore remains HIGH. The sudden-change-in-drive-output signal VF1 therefore goes LOW only in sudden change period TVF1 in which the drive output tracking signal VB1 level changes suddenly, and is otherwise HIGH.

Improving the response of the focus loss-reducing power supply 2300 using this sudden-change-in-drive-output signal VF1 is described next.

VTF Generating Unit

Figure 14:
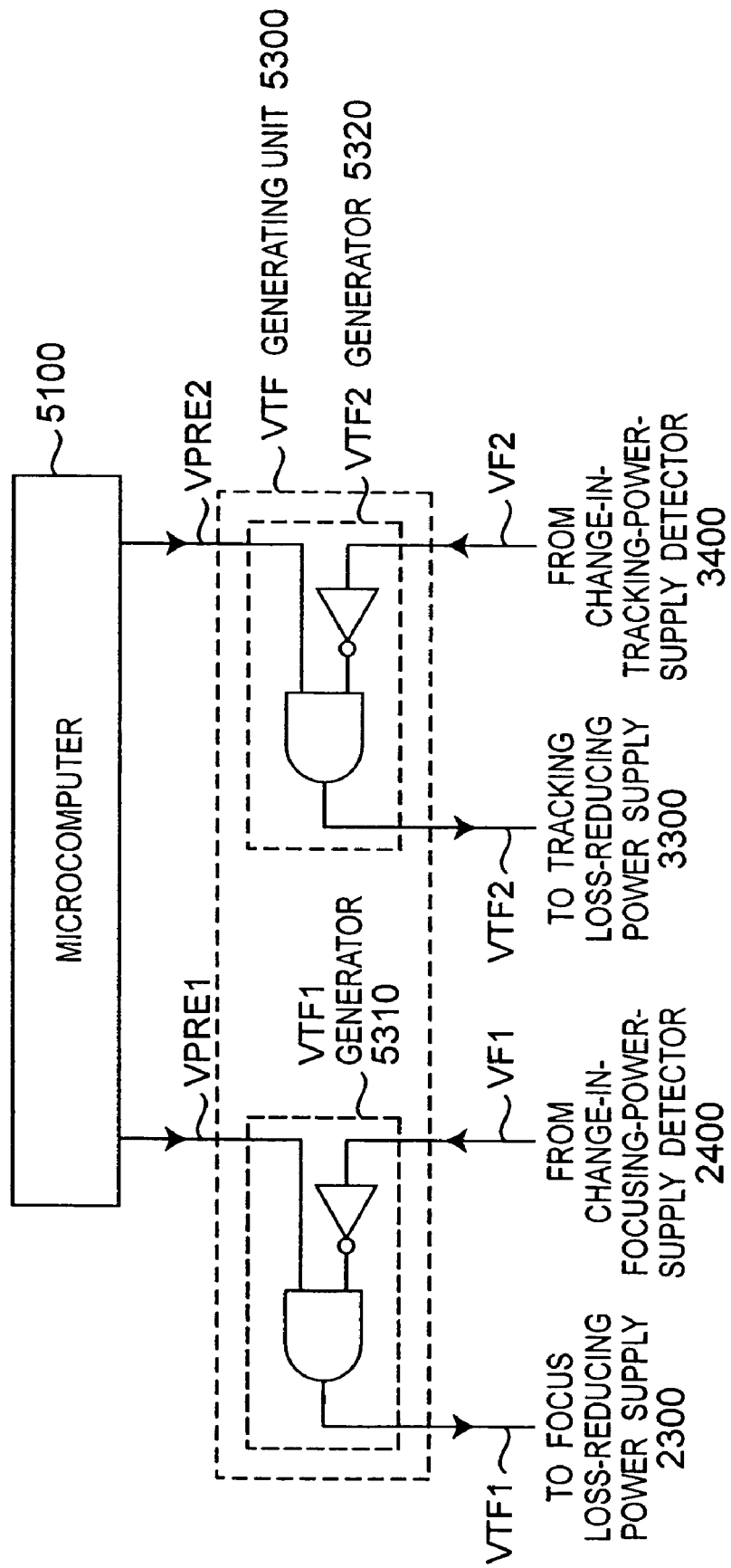
FIG. 14 is a circuit diagram of the VTF generating unit in the first embodiment shown in FIG. 3.

FIG. 14 is a circuit diagram of the VTF generating unit 5300 in the first embodiment shown in FIG. 3.

In the DSP unit 5000 shown in FIG. 3, the microcomputer 5100 outputs a command to the servo circuit 5200 according to the operating condition of the drive apparatus, and thus controls the focusing drive circuit 220 by way of the servo circuit 5200. Whether the command from the microcomputer 5100 improves the response of the focus loss-reducing power supply 2300 is determined by a predetermined evaluation process run by the DSP unit 5000. The result is output from the microcomputer 5100 as response improvement not-needed period detection signal VPRE1 and input to the VTF1 generator 5310 in the VTF generating unit 5300. The VTF1 generator 5310 applies a logic operation with the sudden-change-in-drive-output signal VF1 output from change-in-focusing-power-supply detector 2400, and the logic result is input as sudden operation signal VTF1 to the focus loss-reducing power supply 2300. This arrangement can thus improve the response of the focus loss-reducing power supply 2300 as desired.

An example of the DSP unit 5000 running a predetermined evaluation process to determine whether to improve the response of the focus loss-reducing power supply 2300 is described, for example, in the interlayer movement control taught in Japanese Patent 3513062. This interlayer movement control determines and analyzes the focus jump location and whether the focus jump was successful. By avoiding jumping where the likelihood of failure is high, the number of collisions occurring at the same location can be reduced and scratches that would be fatal to the disc can be prevented. This means that if focus jumping is to be avoided, it is not necessary to improve the response of the focus loss-reducing power supply 2300. This is described more specifically below.

For focus jumping with interlayer movement control, the number of attempted jumps and the success rate are stored for each zone. Focus jumping is allowed in zones where the number of attempted focus jumps is greater than or equal to a predetermined count and the success rate is less than or equal to a predetermined rate. More specifically, setting the response improvement not-needed period detection signal VPRE1 in FIG. 14 HIGH causes the sudden-change-in-drive-output signal VF1 of the change-in-focusing-power-supply detector 2400 to pass and be returned to the focus loss-reducing power supply 2300 as sudden operation signal VTF1. In other words, the focus loss-reducing power supply 2300 is instructed to improved response.

Focus jumping is prohibited in zones where the number of attempted focus jumps is greater than or equal to the predetermined count and the success rate is less than or equal to the predetermined level. That is, setting response improvement not-needed period detection signal VPRE1 in FIG. 14 LOW blocks the sudden-change-in-drive-output signal VF1 from the change-in-focusing-power-supply detector 2400, and thus holds the response of the focus loss-reducing power supply 2300 at the current level.

This operation is further described with reference to FIG. 8. FIG. 8 shows the sudden-change-in-drive-output signal VF1, response improvement not-needed period detection signal VPRE1, and sudden operation signal VTF1 along the time base.

As described above, sudden-change-in-drive-output signal VF1 goes low in the sudden change period TVF1 where drive output tracking signal VB1 changes suddenly, and is HIGH otherwise. The level of response improvement not-needed period detection signal VPRE1 is different in response improvement not-needed period TA1 corresponding to the period in which improved response is not needed because focus jumping is prohibited, and response improvement enabled period TB1 corresponding to the period in which response can be improved because focus jumping is allowed.

In response improvement not-needed period TA1, the response improvement not-needed period detection signal VPRE1 is LOW, the result of sudden-change-in-drive-output signal VF1 is blocked, and sudden operation signal VTF1 remains HIGH. In response improvement enabled period TB1, the response improvement not-needed period detection signal VPRE1 goes HIGH, and sudden-change-in-drive-output signal VF1, which goes LOW in the sudden change period TVF1, is passed as sudden operation signal VTF1. Therefore, if sudden change period TVF1 in the response improvement enabled period TB1 is period TVTF1, sudden operation signal VTF1 goes LOW during period TVTF1 and is otherwise HIGH.

While the VTF generating unit 5300 is a hardware construction above, the VTF generating unit 5300 could be a software construction that is executed by the microcomputer 5100 in the DSP unit 5000. Yet further, all of the DSP unit 5000, including the servo circuit 5200, could also be rendered as software programs that are run by one or more microcomputers.

Collisions between the objective lens and the disc can thus be reduced and the optical disc drive can be protected even when focus jumps fail due to local scratches on the disc or an increase in surface acceleration due to warping.

Second Embodiment of a Focus Loss-Reducing Power Supply

Three examples of an embodiment that improves the response of the focus loss-reducing power supply 2300 using sudden operation signal VTF1 are described below.

Figure 15:
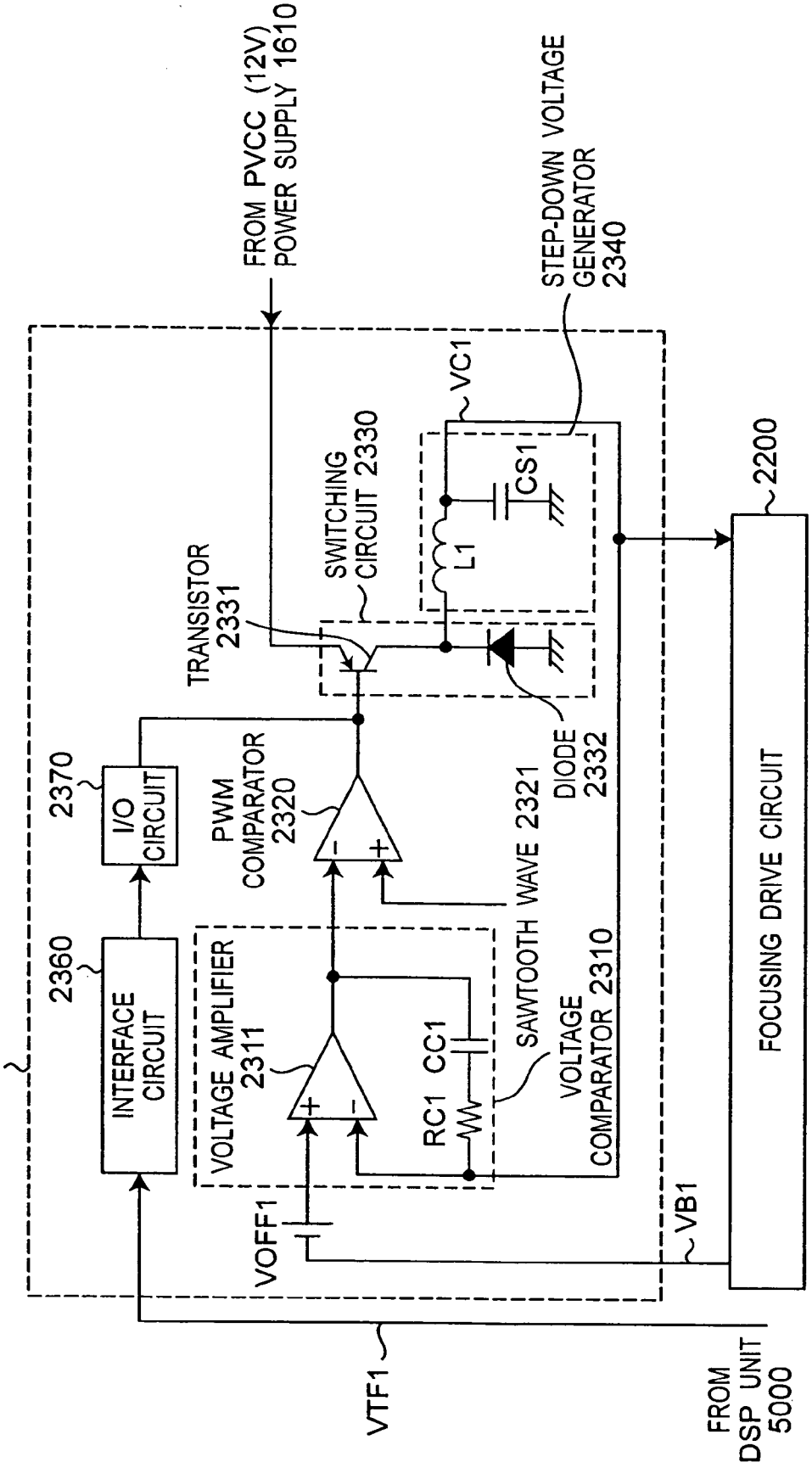
FIG. 15 is a detailed block diagram of a second embodiment of a focus loss-reducing power supply in the first embodiment shown in FIG. 3.

FIG. 15 is a detailed block diagram of a second embodiment of the focus loss-reducing power supply 2300 in the first embodiment shown in FIG. 3. The differences between this embodiment and the first embodiment of the focus loss-reducing power supply 2300 shown in FIG. 4 are described below. The sudden operation signal VTF1 is input to the interface circuit 2360 of the focus loss-reducing power supply 2300, and the output of the interface circuit 2360 goes to the I/O circuit 2370. The output of the I/O circuit 2370 is connected to the control terminal that controls the switching circuit 2330.

Figure 16:
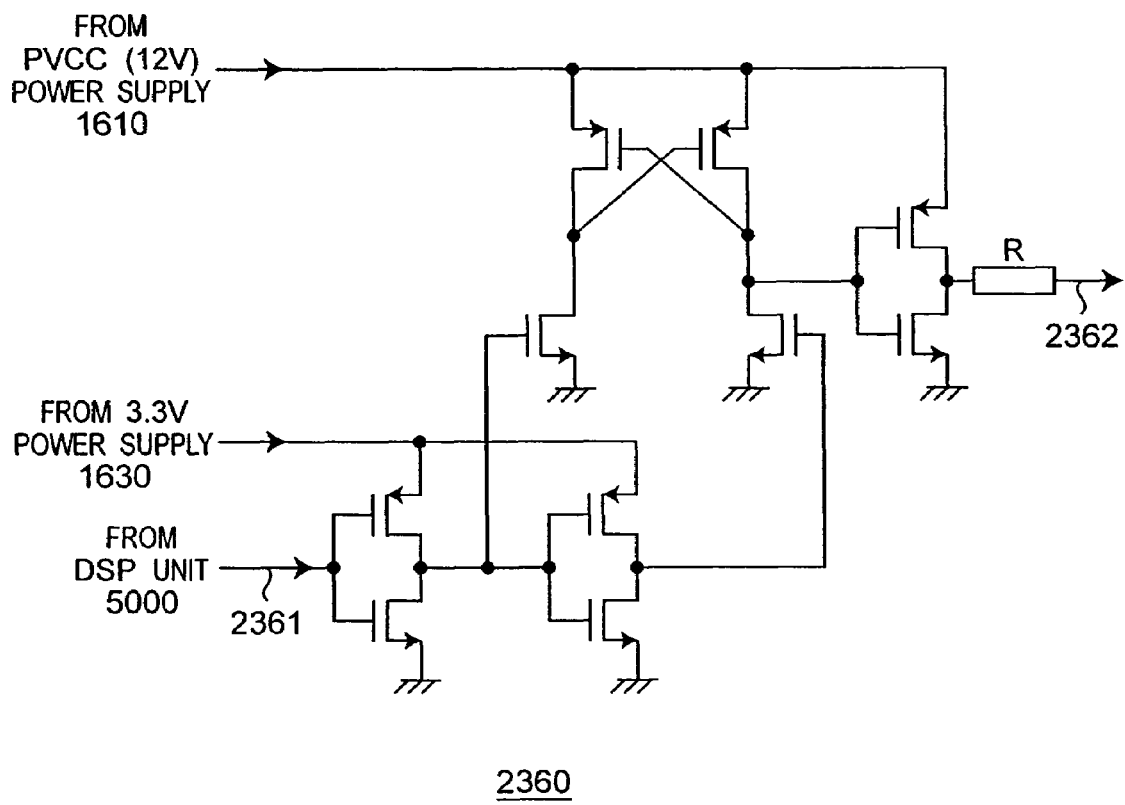
FIG. 16 is a circuit diagram of the interface circuit.
Figure 17:
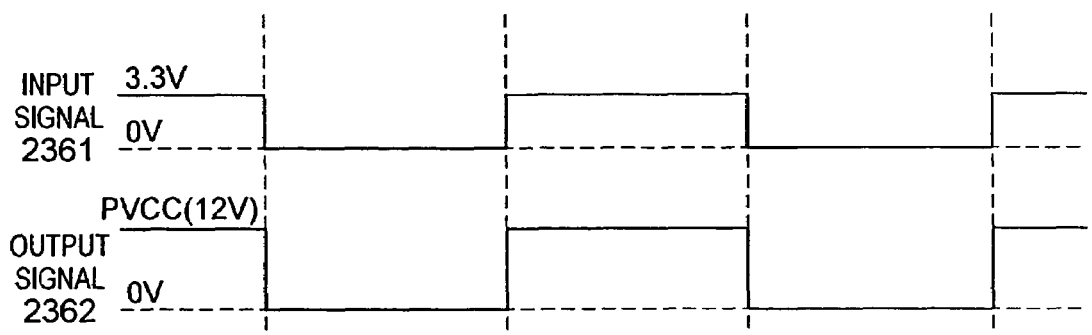
FIG. 17 is a timing chart of interface circuit operation.

FIG. 16 is a circuit diagram of the interface circuit 2360, and FIG. 17 is a timing chart describing the operation of the interface circuit 2360. As will be known from FIG. 16 and FIG. 17, the 0V-3.3V logic levels of the input signal 2361 of which the power supply is the 3.3V power supply 1630 of the DSP unit 5000 is converted to the 0V-PVCC (12V) logic levels of the output signal 2362 of which the power supply is the PVCC (12V) power supply 1610 of the focus loss-reducing power supply 2300. The I/O circuit 2370 shown in FIG. 15 functions to output LOW for a LOW input and to output a high impedance signal for a HIGH input.

The operation of the focus loss-reducing power supply 2300 shown in FIG. 15 is described with reference to FIG. 8. The sudden operation signal VTF1, control output VC1, and drive outputs VO1+ and VO1− are shown in FIG. 8 along the time base.

During the normal operating period TNO, drive outputs VO1+ and VO1− are amplified versions of the drive waveform signal VIN1, and there is no change in the response of drive outputs VO1+ and VO1− even if control output VC1 varies with drive output tracking signal VB1.

Signal output in the abnormal operating period TAB differs in the response improvement enabled period TB1 and response improvement not-needed period TA1.

In the response improvement enabled period TB1, sudden operation signal VTF1 is LOW in period TVTF1 and is otherwise HIGH. I/O circuit 2370 output is therefore LOW in period TVTF1, and switching circuit 2330 is unconditionally on regardless of drive output tracking signal VB1. At this time control output VC1 rises suddenly to nearly the fixed output PVCC (12V) power supply 1610. VC1 is therefore held at the rated constant output because there is no actual change to the fixed output, that is VC1 and the fixed output are equal. As indicated by dotted line PVTF1 in FIG. 8, constant output VC1 in period TVTF1 exhibits good response with the same sharp rise as drive output tracking signal VB1. As a result, drive outputs VO1+ and VO1− have a waveform similar to simply amplified versions of drive waveform signal VIN1. The objective lens of the optical disc drive can thus be instantaneously moved a relative great distance. This is the constant output mode.

Note that as in the previous examples the signals shown in FIG. 8 are expressed in voltage and the constant output VC1 is expressed as voltage. The main signals could, however, be expressed as current and the constant output VC1 could be expressed in terms of current.

Because sudden operation signal VTF1 goes HIGH after period TVTF1, the output of I/O circuit 2370 goes to high impedance, and control output VC1 and drive outputs VO1+ and VO1− return to following the drive output tracking signal VB1. This is the drive output tracking signal dependent mode.

In response improvement not-needed period TA1, sudden operation signal VTF1 remains HIGH and unconditional operation caused by sudden operation signal VTF1 does not occur even if drive output tracking signal VB1 rises suddenly as indicated by dotted line PVF1. Operation depends on drive output tracking signal VB1 in this situation, that is, operation continues in the drive output tracking signal dependent mode, but the switching circuit 2330 does not switch on suddenly when the drive output tracking signal VB1 changes suddenly even if the control output VC1 is driven to change according to the drive output tracking signal VB1 because of the phase compensation filter composed of the capacitance CC1 and resistance RC1 connected to the voltage amplifier 2311 in the focus loss-reducing power supply 2300. As a result, control output VC1 and drive outputs VO1+ and VO1− do not respond comparably to drive output tracking signal VB1 as indicated by dotted line PVB1.

When focus jump operation is prohibited in a zone where the number of attempted focus jumps is greater than or equal to the predetermined count and the success rate is less than or equal to a predetermined level using the interlayer movement control method taught in Japanese Patent 3513062, the effect of the sudden-change-in-drive-output signal VF1 of change-in-focusing-power-supply detector 2400 can be prevented by setting the response improvement not-needed period detection signal VPRE1 in FIG. 8 LOW, and the response of focus loss-reducing power supply 2300 can be made relatively slow.

Collisions between the objective lens and the disc can thus be reduced and the optical disc drive can be protected even when focus jumps fail due to local scratches on the disc or an increase in surface acceleration due to warping.

When the protection afforded the optical disc drive by the DSP unit 5000 can be thus reduced to a degree, the same effect can be achieved by inputting the sudden-change-in-drive-output signal VF1 of the change-in-focusing-power-supply detector 2400 directly to the interface circuit 2360 of the focus loss-reducing power supply 2300, inputting the output of the interface circuit 2360 to the I/O circuit 2370, and driving the control terminal of the switching circuit 2330 with the output from the I/O circuit 2370.

The transistor 2331 and diode 2332 composing the switching circuit 2330 shown in FIG. 15 can be replaced by two MOS power transistors, and the two MOS power transistors can be operated using a synchronous rectifier method. In this case the PWM comparator 2320 is arranged to control these two synchronous rectifier MOS power transistors as described above.

Third Embodiment of a Focus Loss-Reducing Power Supply

Figure 18:
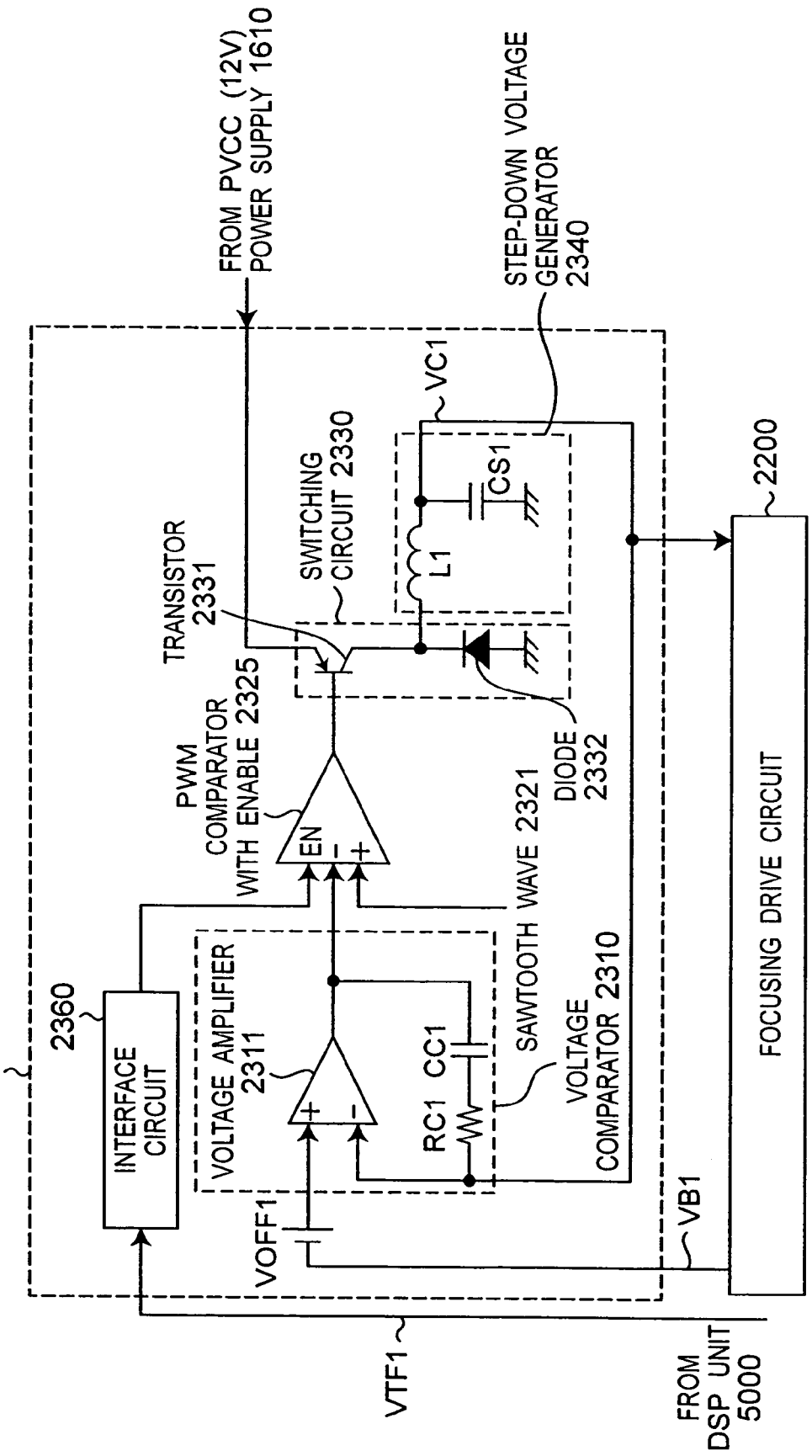
FIG. 18 is a detailed block diagram of a third embodiment of a focus loss-reducing power supply in the first embodiment shown in FIG. 3.

FIG. 18 is a detailed block diagram of a third embodiment of the focus loss-reducing power supply 2300 in the first embodiment shown in FIG. 3. The differences between this embodiment and the second embodiment of the focus loss-reducing power supply 2300 shown in FIG. 15 are described below.

The PWM comparator 2320 of the focus loss-reducing power supply 2300 shown in FIG. 15 is replaced in this embodiment by a PWM comparator 2325 with an ENABLE terminal, and the output signal from the interface circuit 2360 is input to the EN terminal of the PWM comparator with ENABLE 2325.

In this arrangement the PWM comparator with ENABLE 2325 is enabled when the sudden operation signal VTF1 goes HIGH, and normal operation continues in the drive output tracking signal dependent mode. The control output VC1 and drive outputs VO1+ and VO1− therefore exhibit relatively slow response as indicated by dotted line PVB1 in FIG. 8 even in sudden change period TVF1.

If sudden operation signal VTF1 is LOW, PWM comparator with ENABLE 2325 is disabled and outputs LOW. As a result, switching circuit 2330 goes unconditionally ON regardless of drive output tracking signal VB1. This causes control output VC1 of focus loss-reducing power supply 2300 to go unconditionally to the constant output substantially equal to the voltage of the fixed output PVCC (12V) power supply 1610 regardless of drive output tracking signal VB1. As indicated by dotted line PVTF1 in FIG. 8, the constant output VC1 in period TVTF1 exhibits the same good response as the sharp rise in drive output tracking signal VB1, and drive outputs VO1+ and VO1− assume a waveform approximately the same as an amplified version of drive waveform signal VIN1. That is, operation enters the constant output mode. This third embodiment of the focus loss-reducing power supply thus affords the same effect as the second embodiment.

Fourth Embodiment of a Focus Loss-Reducing Power Supply

Figure 19:
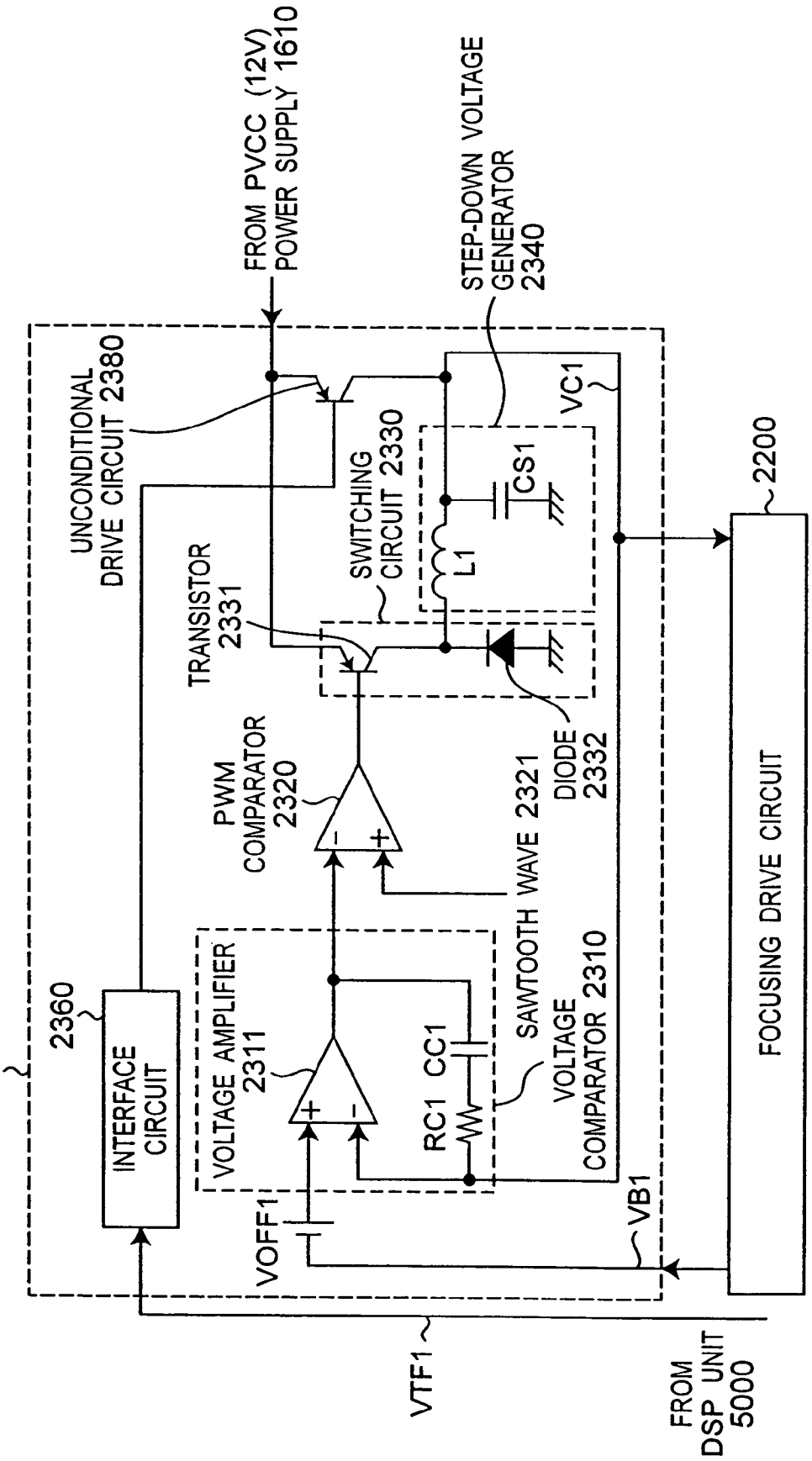
FIG. 19 is a detailed block diagram of a fourth embodiment of a focus loss-reducing power supply in the first embodiment shown in FIG. 3.

FIG. 19 is a detailed block diagram of a fourth embodiment of the focus loss-reducing power supply 2300 in the first embodiment shown in FIG. 3. The differences between this embodiment and the second embodiment of the focus loss-reducing power supply 2300 shown in FIG. 15 are described below.

In the focus loss-reducing power supply 2300 shown in FIG. 19, one side of coil L1 and one side of charging capacitor CS1 are connected to the control output terminal that outputs control output VC1. An unconditional drive circuit 2380 is added between this control output terminal and the fixed output PVCC (12V) power supply 1610, and the sudden operation signal VTF1 from DSP unit 5000 is connected through interface circuit 2360 to the control terminal for controlling unconditional drive circuit 2380. A pnp transistor is used for unconditional drive circuit 2380 in this embodiment of the invention with the collector connected to the control output terminal, the emitter connected to the PVCC (12V) power supply 1610, and the base connected to the interface circuit 2360. Note that the same effect can be achieved by using a p-channel MOS transistor instead of a pnp transistor as the unconditional drive circuit 2380.

When sudden operation signal VTF1 is HIGH in this arrangement, unconditional drive circuit 2380 is OFF, and normal control proceeds in the drive output tracking signal dependent mode. As a result, control output VC1 and drive outputs VO1+ and VO1− therefore exhibit relatively slow response as indicated by dotted line PVB1 in FIG. 8 even in sudden change period TVF1.

When sudden operation signal VTF1 is LOW, unconditional drive circuit 2380 is ON, and control output VC1 of focus loss-reducing power supply 2300 goes unconditionally to the constant output substantially equal to the voltage of the fixed output PVCC (12V) power supply 1610 regardless of drive output tracking signal VB1. As indicated by dotted line PVTF1 in FIG. 8, the constant output VC1 in period TVTF1 exhibits the same good response as the sharp rise in drive output tracking signal VB1, and drive outputs VO1+ and VO1− assume a waveform approximately the same as an amplified version of drive waveform signal VIN1. That is, operation enters the constant output mode.

In the second and third embodiments the charging capacitor CS1 is charged through coil L1, but in this fourth embodiment the unconditional drive circuit 2380 charges the charging capacitor CS1 directly. The rise in constant output VC1 therefore occurs more quickly in this fourth embodiment than in the second and third embodiments, and this fourth embodiment is thus preferred for improving the rise in the period indicated by dotted line PVTF1 in FIG. 8.

The first embodiment above is described with particular reference to the focusing unit 2000 shown in FIG. 3, but the tracking unit 3000 features the same arrangement and operation as the focusing unit 2000 and therefore also affords the same benefits.

More particularly, the tracking unit 3000 has a tracking loss-reducing power supply 3300, and has a fourth embodiment with the same arrangement as the fourth embodiment of the focus loss-reducing power supply 2300 described above. This fourth embodiment of the tracking loss-reducing power supply 3300 has an unconditional drive circuit 3380 corresponding to the unconditional drive circuit 2380 in the fourth embodiment of the focus loss-reducing power supply 2300. The arrangement, operation, and effects of the fourth embodiment of the tracking loss-reducing power supply 3300 are thus the same as the fourth embodiment of the focus loss-reducing power supply 2300.

Other embodiments of the focusing unit 2000 and tracking unit 3000 will also be obvious to one with ordinary skill in the art, and such embodiments will also afford the same effect as a result of having the same arrangement and operation.

Figure 20:
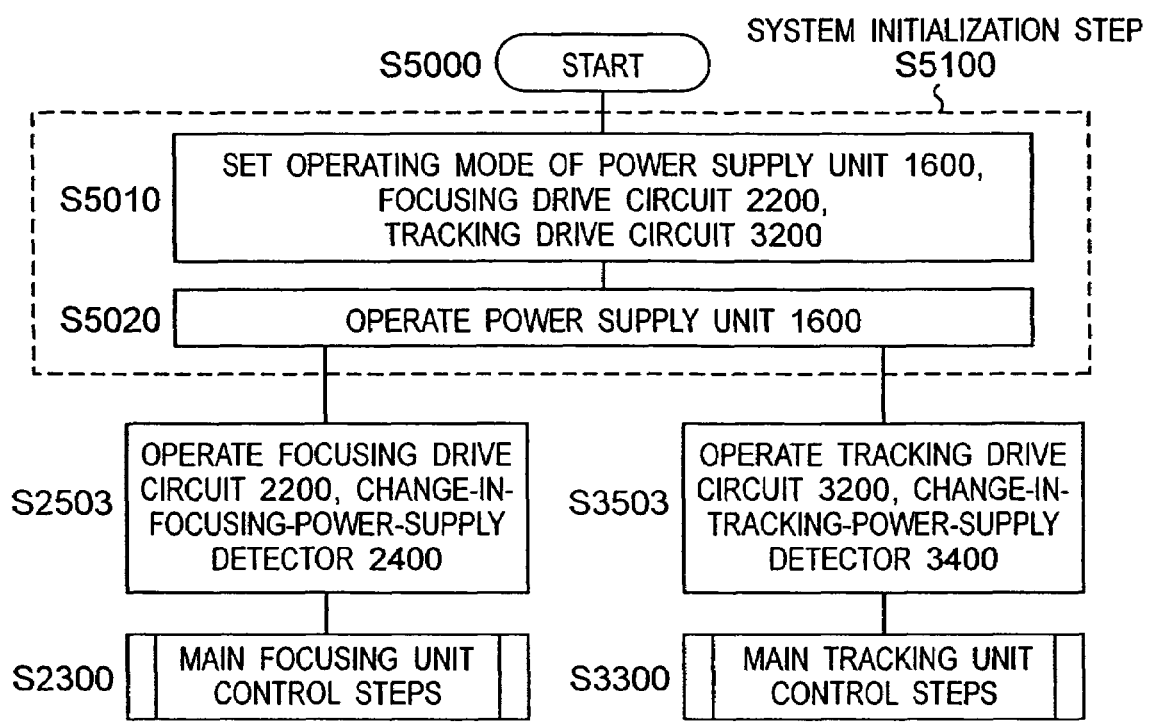
FIG. 20 is a first example of a flow chart describing the operation of the first embodiment of the invention.

First Example of a Flow Chart Describing Operation of the First Embodiment of the Invention FIG. 20 is a first flow chart describing the operation of the first embodiment of the invention described above.

Referring to FIG. 20, the DSP unit 5000 starts operating in step S5000, sets the operating mode of the power supply unit 1600, focusing drive circuit 2200, and tracking drive circuit 3200 in step S5010, and starts operation of the power supply unit 1600 in step S5020. Steps S5010 and S5020 together constitute system initialization step S5100.

Control then splits into a flow chart for the focusing unit 2000 and a flow chart for the tracking unit 3000. For the focusing unit 2000, the focusing drive circuit 2200 and change-in-focusing-power-supply detector 2400 start operating in step S2503, and control then goes to the main focusing unit control step S2300. Details of step S2300 are described with reference to the flow chart in FIG. 21.

Figure 21:
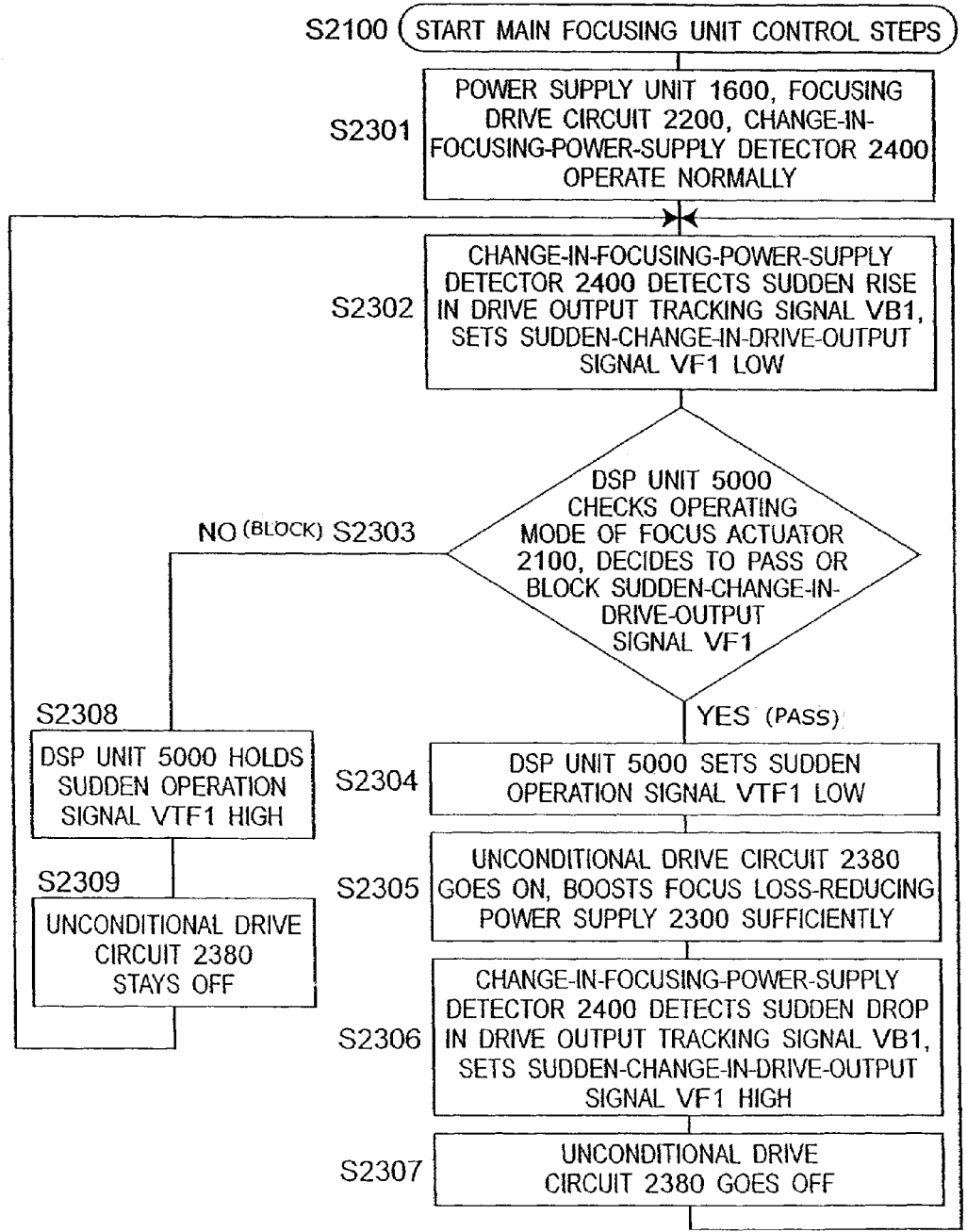
FIG. 21 is a flow chart of the main steps of the focusing unit in the flow chart of the invention shown in FIG. 20.

Referring to FIG. 21, the main focusing unit control step starts in step S2100, and in step S2301 the power supply unit 1600, focusing drive circuit 2200, and change-in-focusing-power-supply detector 2400 escape the period of initial instability and enter the normal operating mode. In step S2302, the change-in-focusing-power-supply detector 2400 monitors sudden change in drive output tracking signal VB1, and sets sudden-change-in-drive-output signal VF1 LOW when a sudden rise is detected. In step S2303, the DSP unit 5000 checks the operating mode of focus actuator 2100, and decides to pass or block sudden-change-in-drive-output signal VF1.

If the DSP unit 5000 decides to block the sudden-change-in-drive-output signal VF1, the DSP unit 5000 holds sudden operation signal VTF1 HIGH in step S2308, and in S2309 unconditional drive circuit 2380 is held OFF. Operation then returns to step S2302.

If in step S2303 the DSP unit 5000 decides to pass sudden-change-in-drive-output signal VF1, in S2304 the DSP unit 5000 sets sudden operation signal VTF1 LOW, in S2305 unconditional drive circuit 2380 goes on, boosting focus loss-reducing power supply 2300 sufficiently, and in S2306 change-in-focusing-power-supply detector 2400 sets sudden-change-in-drive-output signal VF1 HIGH when a sudden drop in drive output tracking signal VB1 is detected. As a result, in S2307 unconditional drive circuit 2380 goes OFF, and control then returns to step S2302.

Returning to step S5020 in FIG. 20, tracking unit 3000 operation is described next with reference to the flow chart in FIG. 22. Note that the flow chart of tracking unit 3000 operation is substantially the same as the flow chart describing focusing unit 2000 operation.

In step S3503 in FIG. 20, tracking drive circuit 3200 and change-in-tracking-power-supply detector 3400 start operating, and control then goes to the main tracking unit step S3300. This main tracking unit step S3300 is described in detail in FIG. 22.

Figure 22:
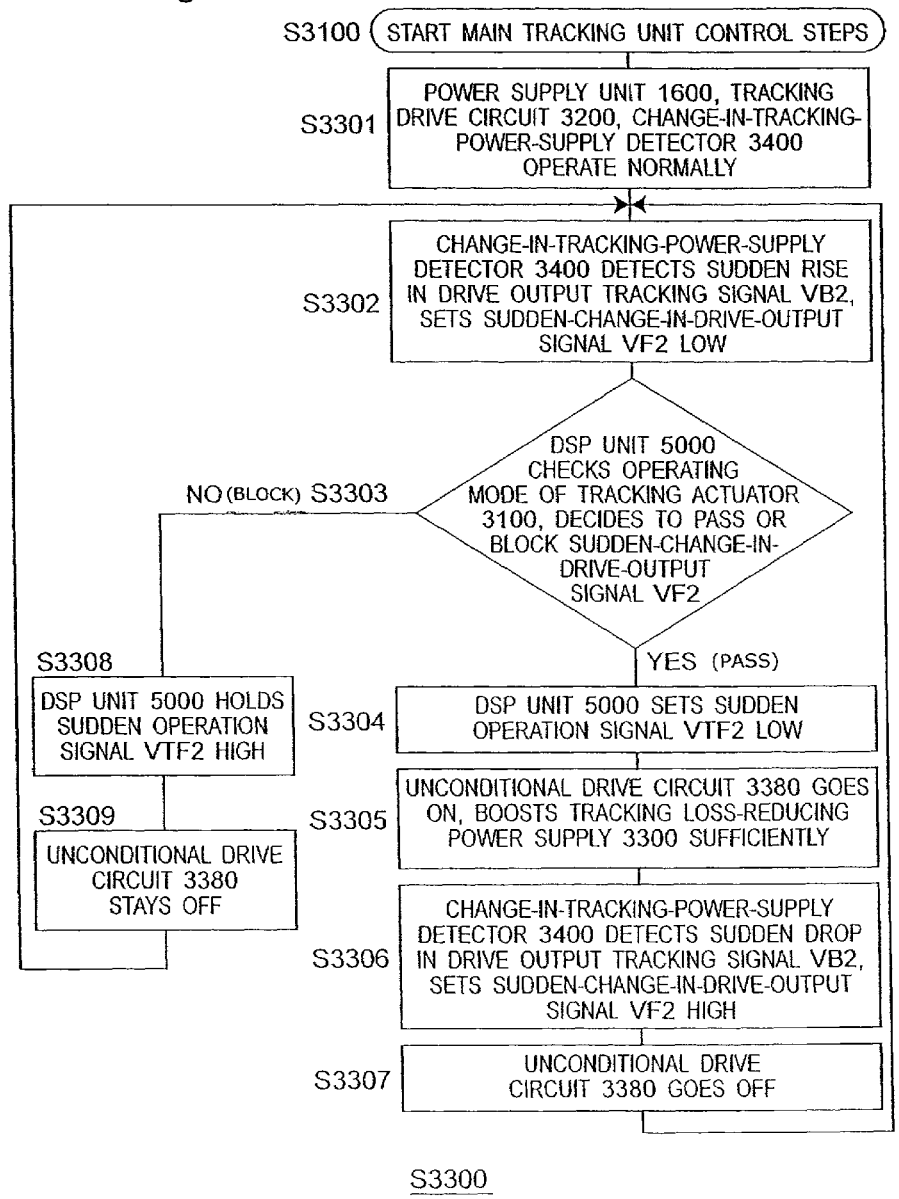
FIG. 22 is a flow chart of the main steps of the tracking unit in the flow chart of the invention shown in FIG. 20.

Referring to FIG. 22, the main tracking unit control step S3100 starts, and in step S3301 the power supply unit 1600, focusing drive circuit 2200, and change-in-tracking-power-supply detector 3400 escape the period of initial instability and enter the normal operating mode. In step S3302, the change-in-tracking-power-supply detector 3400 monitors sudden change in drive output tracking signal VB2, and sets sudden-change-in-drive-output signal VF2 LOW when a sudden rise is detected. In step S3303, the DSP unit 5000 checks the operating mode of tracking actuator 3100, and decides to pass or block sudden-change-in-drive-output signal VF2.

If the DSP unit 5000 decides to block the sudden-change-in-drive-output signal VF2, the DSP unit 5000 holds sudden operation signal VTF2 HIGH in step S3308, and in S3309 unconditional drive circuit 3380 is held OFF. Operation then returns to step S3302.

If in step S3303 the DSP unit 5000 decides to pass sudden-change-in-drive-output signal VF2, in S3304 the DSP unit 5000 sets sudden operation signal VTF2 LOW, in S3305 unconditional drive circuit 3380 goes on, boosting tracking loss-reducing power supply 3300 sufficiently, and in S3306 change-in-tracking-power-supply detector 3400 sets sudden-change-in-drive-output signal VF2 HIGH when a sudden drop in drive output tracking signal VB2 is detected. As a result, in S3307 unconditional drive circuit 3380 goes OFF, and control then returns to step S3302.

Figure 23:
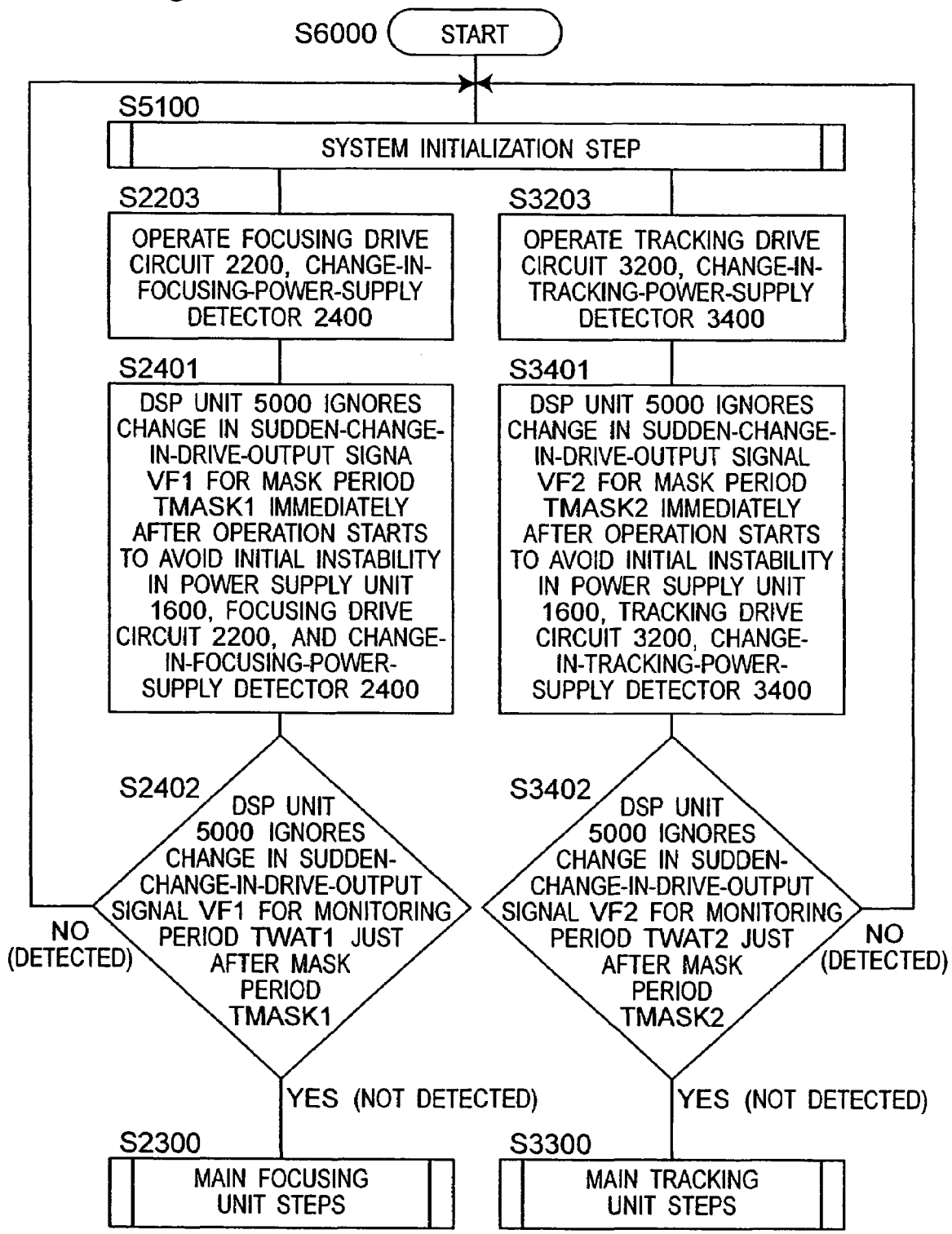
FIG. 23 is a second example of a flow chart describing the operation of the first embodiment of the invention.

Second Example of a Flow Chart Describing Operation of the First Embodiment of the Invention FIG. 23 is a second flow chart describing the operation of the first embodiment of the invention described above.

Referring to FIG. 23, the DSP unit 5000 starts operating in step S6000, and then proceeds to the system initialization step S5100. The system initialization step S5100 is identical to step S5100 shown in FIG. 20, and further description is omitted here.

After step S5100 control then splits into a flow chart for the focusing unit 2000 and a flow chart for the tracking unit 3000. For the focusing unit 2000, the focusing drive circuit 2200 and change-in-focusing-power-supply detector 2400 start operating in step S2203.

In step S2401, a mask period setting arrangement sets a mask period TMASK1 immediately after operation starts to avoid initial instability in power supply unit 1600, focusing drive circuit 2200, and change-in-focusing-power-supply detector 2400. During mask period TMASK1 the DSP unit 5000 ignores change in sudden-change-in-drive-output signal VF1.

In S2402, DSP unit 5000 ignores change in sudden-change-in-drive-output signal VF1 during monitoring period TWAT1 just after mask period TMASK1. Detection of a signal change indicates that operation is still initially unstable, and the DSP unit 5000 therefore returns NO to return control to step S5100. If no signal change is detected operation has stabilized, and the DSP unit 5000 therefore returns YES and proceeds to the main focusing unit control step S2300. This focusing unit control step S2300 is the same as described in FIG. 21, and further description thereof is thus omitted.

For tracking unit 3000 control after the system initialization step S5100, tracking drive circuit 3200 and change-in-tracking-power-supply detector 3400 start operating in step S3203.

In S3401, a mask period setting arrangement sets a mask period TMASK2 immediately after operation starts to avoid initial instability in power supply unit 1600, tracking drive circuit 3200, and change-in-tracking-power-supply detector 3400. During mask period TMASK2, DSP unit 5000 ignores change in sudden-change-in-drive-output signal VF2. In S3402, DSP unit 5000 ignores change in sudden-change-in-drive-output signal VF2 for monitoring period TWAT2 just after mask period TMASK2. Detection of a signal change indicates that operation is still initially unstable, and the DSP unit 5000 therefore returns NO to return control to step S5100. If no signal change is detected operation has stabilized, and the DSP unit 5000 therefore returns YES and proceeds to the main tracking unit control step S3300. This tracking unit control step S3300 is the same as described in FIG. 22, and further description thereof is thus omitted.

This second flow chart shown in FIG. 23 describing the operation of the first embodiment of the invention thus adds steps S2401, S2402, S3401, and S3402 to the first flow chart shown in FIG. 20. These additional steps enable avoiding operating errors due to system instability immediately after the power turns on, and thus improve the operational stability of the optical disc drive.

By controlling operation as shown in these flow charts, a power supply slightly greater than the maximum power required to drive the focus actuator 2100 and tracking actuator 3100 can be used, thus significantly reducing power consumption and significantly reducing heat output.

Furthermore, when a sudden change in the drive output is required, such as when the drive apparatus is subject to mechanical vibration or a disc with excessive warping or eccentricity is inserted, operation can be controlled with good response by asserting an appropriate sudden operation signal.

Yet further, when focus jump fails due to scratches on the disc or an increase in surface acceleration due to warping, response is conversely delayed by the DSP unit interrupting assertion of the sudden operation signal, and collisions between the objective lens and disc surface can thus be reduced.

Second Embodiment

Figure 24:
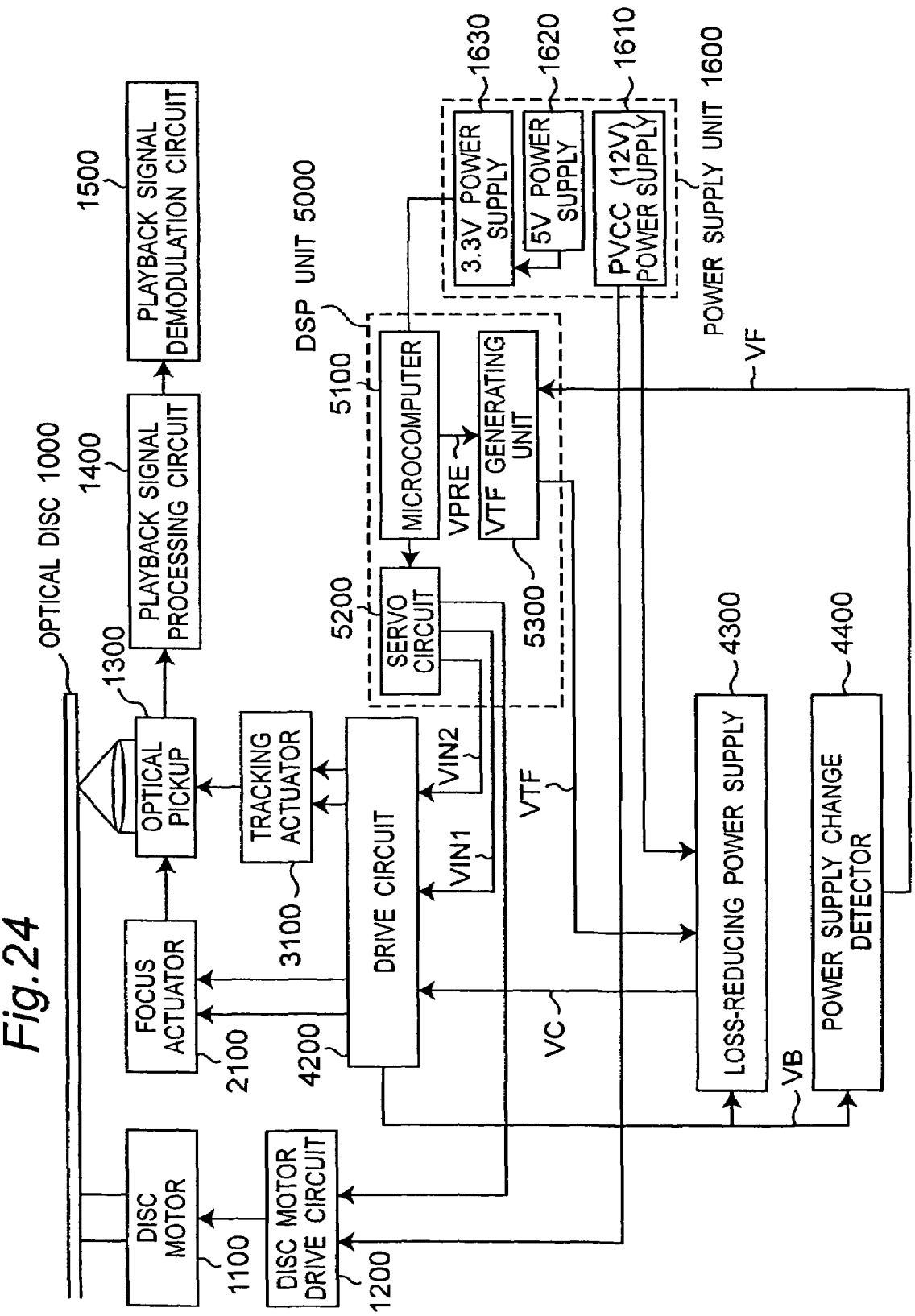
FIG. 24 is a block diagram of a drive apparatus according to a second embodiment of the invention.
Figure 25:
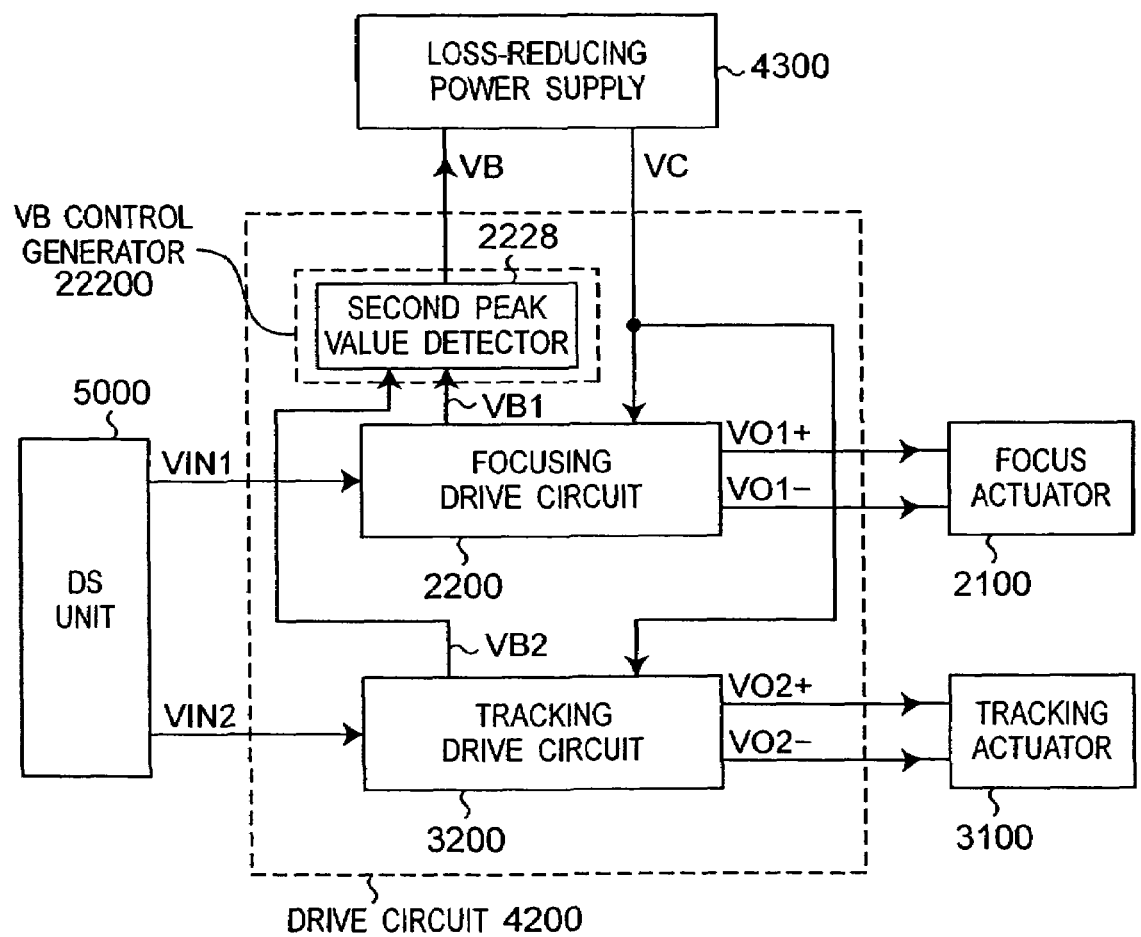
FIG. 25 is a detailed block diagram of the drive circuit in the second embodiment of the invention shown in FIG. 24.

FIG. 24 is a block diagram of a drive apparatus according to a second embodiment of the invention. FIG. 25 is a block diagram of the drive circuit 4200 in the second embodiment shown in FIG. 24. The second embodiment shown in FIG. 24 differs from the first embodiment shown in FIG. 3 in that the focus loss-reducing power supply 2300 and tracking loss-reducing power supply 3300 are combined into a single loss-reducing power supply 4300, the change-in-focusing-power-supply detector 2400 and change-in-tracking-power-supply detector 3400 are combined into a single power supply change detector 4400, and the focusing drive circuit 2200 and tracking drive circuit 3200 are combined into a single drive circuit 4200. While a loss-reducing power supply 4300 and power supply change detector 4400 is provided separately for the focusing unit and tracking unit in the first embodiment shown in FIG. 3, the system requires only one of each of these in this second embodiment. Therefore, the arrangement, operation, and effect of focus loss-reducing power supply 2300, tracking loss-reducing power supply 3300, and loss-reducing power supply 4300 are the same, and the arrangement, operation, and effect of change-in-focusing-power-supply detector 2400, change-in-tracking-power-supply detector 3400, and power supply change detector 4400 are also the same. The loss-reducing power supply 4300 also contains a tracking signal offset voltage VOFF that is identical in structure, operation, and effect as the tracking signal offset voltage VOFF1 of the focus loss-reducing power supply 2300.

The drive circuit 4200 is basically the same as the drive circuits in the first embodiment shown in FIG. 3, and has focusing drive circuit 2200 and tracking drive circuit 3200.

The focusing drive circuit 2200 and tracking drive circuit 3200 can be rendered in the same way as the first embodiment of a focusing drive circuit shown in FIG. 4, the second embodiment of a focusing drive circuit shown in FIG. 9, or the third embodiment of a focusing drive circuit as shown in FIG. 11.

Regarding the drive output tracking signal, a VB control generator 2220 is rendered in both the focusing drive circuit 2200 and tracking drive circuit 3200 in FIG. 25. These two VB control generators 2220 respectively output drive output tracking signals VB1 and VB2. The second peak value detector 2228, which is a specific embodiment of VB control generator 22200, takes the peak value of secondary drive output tracking signals VB1 and VB2 to generate drive output tracking signal VB. This drive output tracking signal VB is then input to loss-reducing power supply 4300.

More specifically, drive output tracking signal VB includes the peak value of the two drive output tracking signals VB1 and VB2, and is a signal equal to the maximum value of these two signals. Furthermore, because the control output VC of the loss-reducing power supply 4300 is the supply voltage of the drive output generating elements containing in focusing drive circuit 2200 and tracking drive circuit 3200, power consumption and heat output by the linear drive output generating elements can be suppressed by appropriately setting the tracking signal offset voltage VOFF (to zero or a desirable positive or negative value) while still supplying the current required to drive focus actuator 2100 and tracking actuator 3100.

In this second embodiment of the invention the two VB control generators 2220 in the focusing drive circuit 2200 and tracking drive circuit 3200 are referred to as "secondary drive output tracking signal generator" and the VB control generator 22200 is referred to as a "wrapping arrangement"

This second embodiment of the invention can thus significantly reduce power consumption and significantly reduce heat output while supplying only slighter greater power than the peak drive output required to drive the focus actuator 2100 and tracking actuator 3100.

Furthermore, when a sudden change in the drive output is required, such as when the drive apparatus is subject to mechanical vibration or a disc with excessive warping or eccentricity is inserted, operation can be controlled with good response by asserting an appropriate sudden operation signal.

Yet further, when focus jump fails due to scratches on the disc or an increase in surface acceleration due to warping, response is conversely delayed by the DSP unit interrupting assertion of the sudden operation signal, and collisions between the objective lens and disc surface can thus be reduced.

In the preferred embodiments of the present invention described above the control output that is a fundamental part of the present invention is produced to be slightly greater than the drive output. The optimum conditions enabling a maximum reduction in power consumption is to add the loss incurred by the drive output generating elements to transient peaks in the drive output required by the focusing and tracking actuators 2100, 3100. In order to easily implement the present invention in a variety of drive apparatuses cost effectively, the power supply may have more gradual peaks and valleys than the peak waveform of the drive output. Power consumption will be somewhat greater in this case than under these ideal conditions, but the reduction in power consumption will be significantly greater than can be achieved by the technology taught in Japanese Unexamined Patent Appl. Pub. 2003-132555.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A drive apparatus operable to supply drive output to an actuator operable to operate a movable head, comprising:
    a fixed output generator operable to produce a predetermined fixed output;
    a drive output tracking signal generator operable to detect the drive output required to drive the actuator, and to generate a drive output tracking signal that follows the drive output;
    a control output generator operable to generate control output slightly greater than the drive output based on the fixed output and the drive output tracking signal; and
    a drive output generator operable to produce the drive output using the control output.

2. The drive apparatus according to claim 1, further comprising:
    a sudden-change-in-drive-output detector operable to detect a sudden change period in which the drive output tracking signal changes suddenly;
    wherein the control output generator improves response by outputting a constant output containing no actual change in the fixed output during the sudden change period.

3. The drive apparatus according to claim 2, further comprising:
    a response improvement not-needed period detector operable to detect response improvement not-needed period in which improved response is not needed;
    wherein the constant output is not output in the response improvement not-needed period even if a sudden change period is detected.

4. The drive apparatus according to claim 1, wherein:
    the actuator comprises first and second input terminals;
    the drive output generator comprises
        a servo circuit operable to generate a drive waveform signal, and
        a drive circuit;
    wherein the drive circuit comprises a drive output generating element group operable to generate a pair of drive outputs with an opposite phase relationship using the control output based on the drive waveform signal; and
    the pair of drive outputs is supplied to the first and second input terminals.

5. The drive apparatus according to claim 4, wherein the drive output tracking signal is based on the absolute value of the difference between the drive waveform signal and a predetermined first reference voltage.

6. The drive apparatus according to claim 1, wherein the drive output tracking signal is the greatest of a plurality of drive outputs.

7. The drive apparatus according to claim 4, wherein the pair of drive outputs are supplied to the first and second input terminals of the actuator from the emitter or source terminals of the pair of drive output generating elements; and
    the drive output tracking signal is the maximum base voltage or gate voltage of the pair of drive output generating elements.

8. The drive apparatus according to claim 4, wherein the drive output generating elements are npn transistors or n-channel MOS transistors.

9. The drive apparatus according to claim 1, wherein the movable head is an optical pickup.

10. The drive apparatus according to claim 2, wherein the sudden-change-in-drive-output detector comprises:
a differentiating circuit operable to differentiate the drive output tracking signal; and
a wave shaping circuit operable to detect a period in which the absolute value of the output of the differentiating circuit exceeds a predetermined level as the sudden change period, and to generate a sudden-change-in-drive-output signal representing the sudden change period.

11. The drive apparatus according to claim 3, wherein the response improvement not-needed period detector comprises a mask period setting arrangement operable to set a predetermined mask period operable to avoid initial operating instability, and
the response improvement not-needed period is in the mask period.

12. The drive apparatus according to claim 1, wherein the actuator is a focus actuator operable to move the objective lens of the movable head in the focusing direction; and
the drive output generator is a focusing drive output generator operable to supply drive output to the focus actuator.

13. The drive apparatus according to claim 1, wherein the actuator is a tracking actuator operable to move the objective lens of the movable head in the tracking direction; and
the drive output generator is a tracking drive output generator operable to supply drive output to the tracking actuator.

14. The drive apparatus according to claim 1, wherein there are n actuators and n drive output generator; and
the drive output tracking signal generator comprises
n secondary drive output tracking signal generator operable to detect at least the n drive outputs required to drive each of the n actuators, and to generate n secondary drive output tracking signals following the n drive outputs, and
a wrapping arrangement operable to bundle the n secondary drive output tracking signals and to generate a single drive output tracking signal.

15. The drive apparatus according to claim 2, wherein the control output generator comprises a step-down DC-DC converter operable to generate a supply voltage corresponding to a second reference voltage that is equal to the drive output tracking signal plus a predetermined tracking signal offset voltage; and
the step-down DC-DC converter generates the control output based on the fixed output and the second reference voltage.

16. The drive apparatus according to claim 15, wherein:
the step-down DC-DC converter comprises
a voltage comparator operable to compare the second reference voltage and the output voltage of the step-down DC-DC converter, and to output the voltage difference;
a PWM comparator operable to convert the voltage difference to a PWM signal;
a switching circuit operable to switch the fixed output based on the PWM signal; and
a step-down voltage generator operable to convert the switched fixed output to the control output;
the step-down voltage generator comprises a coil and a capacitor; and
the control output is output from a control output terminal to which the coil and capacitor are connected.

17. The drive apparatus according to claim 16, wherein:
the switching circuit comprises a pnp transistor having the base connected to a control terminal operable to control the switching circuit, the emitter connected to the fixed output generator, and the collector connected to the output terminal of the switching circuit; and
a diode of which the anode is to ground and the cathode is connected to the collector of the transistor and the output terminal of the switching circuit.

18. The drive apparatus according to claim 16, wherein the switching circuit comprises two MOS power transistors in a synchronous rectifier circuit.

19. The drive apparatus according to claim 3, wherein the control output generator generates a sudden operation signal denoting the sudden change period outside the response improvement not-needed period.

20. The drive apparatus according to claim 2, wherein;
the control output generator comprises an unconditional drive circuit;
the sudden operation signal is input to the control terminal operable to control the unconditional drive circuit; and
the unconditional drive circuit is connected between the control output terminal and the fixed output terminal, goes ON in the sudden change period to cause the control output generator to output the constant output, and is otherwise OFF so that the control output generator outputs the control output.

21. The drive apparatus according to claim 20, wherein:
the unconditional drive circuit comprises one pnp transistor; and
the emitter of the pnp transistor is connected to fixed output terminal, the collector is connected to the control output terminal, and the base is connected to the control terminal of the unconditional drive circuit.

22. The drive apparatus according to claim 20, wherein:
the unconditional drive circuit comprises one p-channel MOS transistor; and
the source of the p-channel MOS transistor is connected to fixed output terminal, the drain is connected to the control output terminal, and the gate is connected to the control terminal of the unconditional drive circuit.

23. The drive apparatus according to claim 2, wherein the sudden operation signal is input to the control terminal of the switching circuit; and
in the sudden change period the switching circuit goes ON and the control output generator outputs the constant output, and the switching circuit is otherwise OFF and the control output generator outputs the control output.

24. The drive apparatus according to claim 2, wherein the PWM comparator has an ENABLE terminal;
the sudden operation signal is input to the enable terminal; and
in the sudden change period the switching circuit goes ON and the control output generator outputs the constant output, and the switching circuit is otherwise OFF and the control output generator outputs the control output.

25. The drive apparatus according to claim 1, wherein:
the control output generator comprises a step-down DC-DC converter operable to generate a supply voltage corresponding to a second reference voltage that is equal to the drive output tracking signal plus a predetermined tracking signal offset voltage; and
the step-down DC-DC converter generates the control output based on the fixed output and the second reference voltage.

26. The drive apparatus according to claim 25, wherein:
the step-down DC-DC converter comprises a voltage comparator operable to compare the second reference voltage and the output voltage of the step-down DC-DC converter, and to output the voltage difference;

a PWM comparator operable to convert the voltage difference to a PWM signal;

a switching circuit operable to switch the fixed output based on the PWM signal; and a step-down voltage generator operable to convert the switched fixed output to the control output;

the step-down voltage generator comprises a coil and a capacitor; and the control output is output from a control output terminal to which the coil and capacitor are connected.

27. The drive apparatus according to claim 26, wherein:

the switching circuit comprises a pnp transistor having the base connected to a control terminal operable to control the switching circuit, the emitter connected to the fixed output terminal of the fixed output generator, and the collector connected to the output terminal of the switching circuit; and a diode of which the anode is to ground and the cathode is connected to the collector of the transistor and the output terminal of the switching circuit.

28. The drive apparatus according to claim 26, wherein the switching circuit comprises two MOS power transistors in a synchronous rectifier circuit.

29. A method operable to supply drive output to an actuator operable to operate a movable head, comprising:

a step of producing a predetermined fixed output;

a step of detecting the drive output required to drive the actuator, and generating a drive output tracking signal that follows the drive output;

a step of generating control output slightly greater than the drive output based on the fixed output and the drive output tracking signal; and a step of producing the drive output using the control output.

* * * * *